United States Patent
Zhamu et al.

(10) Patent No.: US 9,193,132 B2
(45) Date of Patent: Nov. 24, 2015

(54) HIGHLY ORIENTED GRAPHENE STRUCTURES AND PROCESS FOR PRODUCING SAME

(71) Applicants: Aruna Zhamu, Centerville, OH (US); Bor Z Jang, Centerville, OH (US); Yanbo Wang, Huber Heights, OH (US); Lucy Fu, Centerville, OH (US)

(72) Inventors: Aruna Zhamu, Centerville, OH (US); Bor Z Jang, Centerville, OH (US); Yanbo Wang, Huber Heights, OH (US); Lucy Fu, Centerville, OH (US)

(73) Assignee: Nanotek Instruments, Inc., Dayton, OH (US)

(*) Notice: Subject to any disclaimer, the term of this patent is extended or adjusted under 35 U.S.C. 154(b) by 42 days.

(21) Appl. No.: 13/999,283

(22) Filed: Feb. 6, 2014

(65) Prior Publication Data

US 2015/0217538 A1   Aug. 6, 2015

(51) Int. Cl.

| | |
|---|---|
| *B82Y 30/00* | (2011.01) |
| *B82Y 40/00* | (2011.01) |
| *B32B 5/00* | (2006.01) |
| *C01B 31/00* | (2006.01) |
| *C01B 31/04* | (2006.01) |
| *B32B 9/04* | (2006.01) |
| *B32B 37/24* | (2006.01) |
| *B32B 38/00* | (2006.01) |

(52) U.S. Cl.
CPC ... *B32B 9/04* (2013.01); *B32B 5/00* (2013.01); *B32B 37/24* (2013.01); *B32B 38/0004* (2013.01); *B32B 38/0036* (2013.01); *B82Y 30/00* (2013.01); *B82Y 40/00* (2013.01); *C01B 31/00* (2013.01); *C01B 31/04* (2013.01); *B32B 2037/243* (2013.01); *B32B 2307/202* (2013.01); *B32B 2307/302* (2013.01); *B32B 2307/51* (2013.01); *C01B 31/043* (2013.01); *C01B 31/0423* (2013.01); *C01B 31/0438* (2013.01); *C01B 31/0469* (2013.01)

(58) Field of Classification Search
CPC ........ B82Y 30/00; B82Y 40/00; C01B 31/04; C01B 31/0423; C01B 31/043; C01B 31/0438; C01B 31/0469; B32B 5/00
See application file for complete search history.

(56) References Cited

U.S. PATENT DOCUMENTS

| | | | |
|---|---|---|---|
| 7,071,258 B1 | 7/2006 | Jang et al. | |
| 8,226,801 B2 * | 7/2012 | Zhamu ................ | B82Y 30/00 204/157.15 |

(Continued)

OTHER PUBLICATIONS

U.S. Appl. No. 13/385,813, filed Mar. 8, 2012, A. Zhamu, et al.

(Continued)

*Primary Examiner* — Michael N Orlando
*Assistant Examiner* — Matthew Hoover

(57) ABSTRACT

A process for producing a bulk highly oriented graphene structure, comprising: (a) preparing a graphene oxide dispersion having graphene oxide (GO) sheets dispersed in a fluid medium; (b) dispensing and depositing the dispersion onto a surface of a supporting substrate to form a layer of GO, wherein the dispensing and depositing procedure includes subjecting the dispersion to an orientation-inducing stress; (c) removing the fluid medium to form a dried layer of GO having an inter-plane spacing $d_{002}$ of 0.4 nm to 1.2 nm; (d) slicing the dried layer of GO into multiple pieces of dried GO and stacking at least two pieces of dried GO to form a mass of multiple pieces of GO; and (f) heat treating the mass under an optional first compressive stress to produce the highly oriented graphene structure at a first heat treatment temperature higher than 100° C. to an extent that an inter-plane spacing $d_{002}$ is decreased to a value less than 0.4 nm.

37 Claims, 21 Drawing Sheets

(56) References Cited

U.S. PATENT DOCUMENTS

| | | | |
|---|---|---|---|
| 2013/0236715 A1* | 9/2013 | Zhamu | B82Y 30/00 428/220 |
| 2014/0242275 A1* | 8/2014 | Zhamu | C01B 31/0423 427/228 |

OTHER PUBLICATIONS

U.S. Appl. No. 13/694,356, filed Nov. 26, 2012, A. Zhamu, et al.
U.S. Appl. No. 13/694,468, filed Dec. 5, 2012, A. Zhamu, et al.
U.S. Appl. No. 11/509,424, filed Aug. 25, 2006, B. Z. Jang, et al.
U.S. Appl. No. 10/858,814, filed Jun. 3, 2004, B. Z. Jang, et al.
U.S. Appl. No. 11/784,606, filed Apr. 9, 2007, B. Z. Jang, et al.
U.S. Appl. No. 13/694,791, filed Jan. 7, 2013, A. Zhamu, et al.
U.S. Appl. No. 13/815,349, filed Feb. 25, 2013, A. Zhamu, et al.

* cited by examiner (50 μm wide)

HIGHLY ORIENTED GRAPHENE STRUCTURES AND PROCESS FOR PRODUCING SAME

FIELD OF THE INVENTION

The present invention relates generally to the field of graphitic materials and, more particularly, to a new form of graphitic material herein referred to as the bulk highly oriented graphene structure (not thin film) and the process for producing such a structure. This new graphene-derived material exhibits an unprecedented combination of exceptionally high thermal conductivity, high electrical conductivity, high mechanical strength, and high elastic modulus.

BACKGROUND OF THE INVENTION

Carbon is known to have five unique crystalline structures, including diamond, fullerene (0-D nano graphitic material), carbon nano-tube or carbon nano-fiber (1-D nano graphitic material), graphene (2-D nano graphitic material), and graphite (3-D graphitic material). The carbon nano-tube (CNT) refers to a tubular structure grown with a single wall or multi-wall. Carbon nano-tubes (CNTs) and carbon nano-fibers (CNFs) have a diameter on the order of a few nanometers to a few hundred nanometers. Their longitudinal, hollow structures impart unique mechanical, electrical and chemical properties to the material. The CNT or CNF is a one-dimensional nano carbon or 1-D nano graphite material.

Bulk natural graphite is a 3-D graphitic material with each graphite particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). Although all the graphene planes in one grain are parallel to one another, typically the graphene planes in one grain and the graphene planes in an adjacent grain are inclined at different orientations. In other words, the orientations of the various grains in a graphite particle typically differ from one grain to another.

A graphite single crystal (crystallite) per se is anisotropic with a property measured along a direction in the basal plane (crystallographic a- or b-axis direction) being dramatically different than if measured along the crystallographic c-axis direction (thickness direction). For instance, the thermal conductivity of a graphite single crystal can be up to approximately 1,920 W/mK (theoretical) or 1,800 W/mK (experimental) in the basal plane (crystallographic a- and b-axis directions), but that along the crystallographic c-axis direction is less than 10 W/mK (typically less than 5 W/mK). Further, the multiple grains or crystallites in a graphite particle are typically all oriented along different directions. Consequently, a natural graphite particle composed of multiple grains of different orientations exhibits an average property between these two extremes (i.e. between 5 W/mK and 1,800 W/mK).

It would be highly desirable in many applications to produce a bulk graphitic structure (containing single or multiple grains) having sufficiently large dimensions (length, width, and thickness) and having all graphene planes being essentially parallel to one another along one desired direction. In other words, it is highly desirable to have one large-size graphitic structure (e.g. a fully integrated layer of multiple graphene planes) having the c-axis directions of all the graphene planes being substantially parallel to one another and having a sufficiently large length, width, and thickness for a particular application. Up to this point of time, it has not been possible to produce such a highly oriented graphitic structure. Even though some attempts have been made to produce the so-called highly oriented pyrolytic graphite (HOPG) through tedious, energy intensive, and expensive chemical vapor deposition (CVD) followed by ultra-high temperature graphitization, the graphitic structure of the HOPG remains inadequately aligned and, hence, exhibits properties that are significantly lower than theoretically predicted.

The present invention is directed at a new materials science approach to designing and building a new class of materials herein referred to as the highly oriented graphene structure (HOGS). A HOGS is a bulk structure composed of highly aligned graphene or graphene oxide planes, wherein all of the graphene or graphene oxide planes are essentially parallel to one another. These graphene planes are much better aligned than what the conventional HOPG has been able to achieve. Such a HOGS has a thickness typically at least 100 µm, but more typically at least 0.5 mm, and most typically at least 5 mm. In most cases, the HOGS has an oxygen amount of 0.001-5% by weight, but can be essentially oxygen-free. The conventional HOPG contains no oxygen.

The constituent graphene planes of a graphite crystallite can be exfoliated and extracted or isolated to obtain individual graphene sheets of carbon atoms provided the inter-planar van der Waals forces can be overcome. An isolated, individual graphene sheet of carbon atoms is commonly referred to as single-layer graphene. A stack of multiple graphene planes bonded through van der Waals forces in the thickness direction with an inter-graphene plane spacing of approximately 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene or graphene oxide sheets are collectively called "nano graphene platelets" (NGPs). Graphene sheets/platelets (NGPs) are a new class of carbon nano material (a 2-D nano carbon) that is distinct from the 0-D fullerene, the 1-D CNT, and the 3-D graphite.

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004); and (3) B. Z. Jang, A. Zhamu, and J. Guo, "Process for Producing Nano-scaled Platelets and Nanocomposites," U.S. patent application Ser. No. 11/509,424 (Aug. 25, 2006).

NGPs are typically obtained by intercalating natural graphite particles with a strong acid and/or oxidizing agent to obtain a graphite intercalation compound (GIC) or graphite oxide (GO), as illustrated in FIG. 1(A) (process flow chart) and FIG. 1(B) (schematic drawing). The presence of chemical species or functional groups in the interstitial spaces between graphene planes serves to increase the inter-graphene spacing ($d_{002}$, as determined by X-ray diffraction), thereby significantly reducing the van der Waals forces that otherwise hold graphene planes together along the c-axis direction. The GIC or GO is most often produced by immersing natural graphite powder (20 in FIG. 1(A) and 100 in FIG. 1(B)) in a mixture of sulfuric acid, nitric acid (an oxidizing agent), and another oxidizing agent (e.g. potassium permanganate or sodium perchlorate). The resulting GIC (22 or 102) is actually some type of graphite oxide (GO) particles. This GIC or GO is then repeatedly washed and rinsed in water to remove excess acids, resulting in a graphite oxide suspension or dispersion, which contains discrete and visually discernible graphite oxide particles dispersed in water. There are two processing routes to follow after this rinsing step:

Route 1 involves removing water from the suspension to obtain "expandable graphite," which is essentially a mass of dried GIC or dried graphite oxide particles. Upon exposure of expandable graphite to a temperature in the range of typically 800-1,050° C. for approximately 30 seconds to 2 minutes, the GIC undergoes a rapid volume expansion by a factor of 30-300 to form "graphite worms" (24 or 104), which are each a collection of exfoliated, but largely un-separated graphite flakes that remain interconnected. A SEM image of graphite worms is presented in FIG. 2(A).

In Route 1A, these graphite worms (exfoliated graphite or "networks of interconnected/non-separated graphite flakes") can be re-compressed to obtain flexible graphite sheets or foils (26 or 106) that typically have a thickness in the range of 0.1 mm (100 µm)-0.5 mm (500 µm). Alternatively, one may choose to use a low-intensity air mill or shearing machine to simply break up the graphite worms for the purpose of producing the so-called "expanded graphite flakes" (108) which contain mostly graphite flakes or platelets thicker than 100 nm (hence, not a nano material by definition).

Exfoliated graphite worms, expanded graphite flakes, and the recompressed mass of graphite worms (commonly referred to as flexible graphite sheet or flexible graphite foil) are all 3-D graphitic materials that are fundamentally different and patently distinct from either the 1-D nano carbon material (CNT or CNF) or the 2-D nano carbon material (graphene sheets or platelets, NGPs). Flexible graphite (FG) foils can be used as a heat spreader material, but exhibiting a maximum in-plane thermal conductivity of typically less than 500 W/mK (more typically <300 W/mK) and in-plane electrical conductivity no greater than 1,500 S/cm. These low conductivity values are a direct result of the many defects, wrinkled or folded graphite flakes, interruptions or gaps between graphite flakes, and non-parallel flakes (e.g. SEM image in FIG. 2(B)). Many flakes are inclined with respect to one another at a very large angle (e.g. mis-orientation of 20-40 degrees).

In Route 1B, the exfoliated graphite is subjected to high-intensity mechanical shearing (e.g. using an ultrasonicator, high-shear mixer, high-intensity air jet mill, or high-energy ball mill) to form separated single-layer and multi-layer graphene sheets (collectively called NGPs, 33 or 112), as disclosed in our U.S. application Ser. No. 10/858,814. Single-layer graphene can be as thin as 0.34 nm, while multi-layer graphene can have a thickness up to 100 nm, but more typically less than 20 nm.

Route 2 entails ultrasonicating the graphite oxide suspension for the purpose of separating/isolating individual graphene oxide sheets from graphite oxide particles. This is based on the notion that the inter-graphene plane separation bas been increased from 0.3354 nm in natural graphite to 0.6-1.1 nm in highly oxidized graphite oxide, significantly weakening the van der Waals forces that hold neighboring planes together. Ultrasonic power can be sufficient to further separate graphene plane sheets to form separated, isolated, or discrete graphene oxide (GO) sheets. These graphene oxide sheets can then be chemically or thermally reduced to obtain "reduced graphene oxides" (RGO) typically having an oxygen content of 0.001%-10% by weight, more typically 0.01%-5% by weight, most typically and preferably less than 2% by weight.

For the purpose of defining the claims of the instant application, NGPs include discrete sheets/platelets of single-layer and multi-layer pristine graphene, graphene oxide, or reduced graphene oxide (RGO). Pristine graphene has essentially 0% oxygen. RGO typically has an oxygen content of 0.001%-5% by weight. Graphene oxide (including RGO) can have 0.001%-50% by weight of oxygen.

It may be noted that flexible graphite foils (obtained by compressing or roll-pressing exfoliated graphite worms) for electronic device thermal management applications (e.g. as a heat sink material) have the following major deficiencies: (1) As indicated earlier, flexible graphite (FG) foils exhibit a relatively low thermal conductivity, typically <500 W/mK and more typically <300 W/mK. By impregnating the exfoliated graphite with a resin, the resulting composite exhibits an even lower thermal conductivity (typically <<200 W/mK, more typically <100 W/mK). (2) Flexible graphite foils, without a resin impregnated therein or coated thereon, are of low strength, low rigidity, and poor structural integrity. The high tendency for flexible graphite foils to get torn apart makes them difficult to handle in the process of making a heat sink. As a matter of fact, the flexible graphite sheets (typically 50-200 µm thick) are so "flexible" that they are not sufficiently rigid to make a fin component material for a finned heat sink. (3) Another very subtle, largely ignored or overlooked, but critically important feature of FG foils is their high tendency to get flaky with graphite flakes easily coming off from FG sheet surfaces and emitting out to other parts of a microelectronic device. These highly electrically conducting flakes (typically 1-200 µm in lateral dimensions and >100 nm in thickness) can cause internal shorting and failure of electronic devices.

Similarly, solid NGPs (including discrete sheets/platelets of pristine graphene, GO, and RGO), when packed into a film, membrane, or paper sheet (34 or 114) of non-woven aggregates using a paper-making process, typically do not exhibit a high thermal conductivity unless these sheets/platelets are closely packed and the film/membrane/paper is ultra-thin (e.g. <1 µm, which is mechanically weak). This is reported in our earlier U.S. patent application Ser. No. 11/784,606 (Apr. 9, 2007). However, ultra-thin film or paper sheets (<10 µm) are difficult to produce in mass quantities, and difficult to handle when one tries to incorporate these thin films as a heat sink material. In general, a paper-like structure or mat made from platelets of graphene, GO, or RGO (e.g. those paper sheets prepared by vacuum-assisted filtration process) exhibit many defects, wrinkled or folded graphene sheets, interruptions or gaps between platelets, and non-parallel platelets (e.g. SEM image in FIG. 3(B)), leading to relatively poor thermal conductivity, low electric conductivity, and low structural strength. These papers or aggregates of discrete NGP, GO or RGO platelets alone (without a resin binder) also have a tendency to get flaky, emitting conductive particles into air.

Another prior art graphitic material is the pyrolytic graphite film (not bulk), typically thinner than 100 µm. The lower portion of FIG. 1(A) illustrates a typical process for producing prior art pyrolytic graphitic films from a polymer. The process begins with carbonizing a polymer film 46 (e.g. polyimide) at a carbonization temperature of 400-1,000° C. under a typical pressure of 10-15 Kg/cm$^2$ for 2-10 hours to obtain a carbonized material 48, which is followed by a graphitization treatment at 2,500-3,200° C. under an ultrahigh pressure of 100-300 Kg/cm$^2$ for 1-24 hours to form a graphitic film 50. It is technically utmost challenging to maintain such an ultra-high pressure at such an ultrahigh temperature. This is a difficult, slow, tedious, energy-intensive, and extremely expensive process. Furthermore, it has not been possible to produce pyrolytic graphite film thicker than 100 μm from a polymer such as polyimide. This thickness-related problem is inherent to this class of materials due to their difficulty in forming into a thick film while still maintaining an acceptable degree of polymer chain orientation and mechanical strength that are required of proper carbonization and graphitization.

A second type of pyrolytic graphite is produced by high temperature decomposition of hydrocarbon gases in vacuum followed by deposition of the carbon atoms to a substrate surface. This vapor phase condensation of cracked hydrocarbons is essentially a chemical vapor deposition (CVD) process. In particular, highly oriented pyrolytic graphite (HOPG) is the material produced by subjecting the CVD-deposited pyro-carbon to a uniaxial pressure at very high temperatures (typically 3,000-3,300° C.). This entails a thermo-mechanical treatment of combined and concurrent mechanical compression and ultra-high temperature for an extended period of time in a protective atmosphere; a very expensive, energy-intensive, time-consuming, and technically challenging process. The process requires ultra-high temperature equipment (with high vacuum, high pressure, or high compression provision) that is not only very expensive to make but also very expensive and difficult to maintain. Even with such extreme processing conditions, the resulting HOPG still possesses many defects, grain boundaries, and mis-orientations (neighboring graphene planes not parallel to each other), resulting in less-than-satisfactory in-plane properties. Typically, the best prepared HOPG sheet or block typically contains many poorly aligned grains or crystals and a vast amount of grain boundaries and defects.

Similarly, the most recently reported graphene thin film (<2 nm) prepared by catalytic CVD of hydrocarbon gas (e.g. $C_2H_4$) on Ni or Cu surface is not a single-grain crystal, but a poly-crystalline structure with many grain boundaries and defects. With Ni or Cu being the catalyst, carbon atoms obtained via decomposition of hydrocarbon gas molecules at 800-1,000° C. are deposited onto Ni or Cu foil surface to form a sheet of single-layer or few-layer graphene that is poly-crystalline. The grains are typically much smaller than 100 μm in size and, more typically, smaller than 10 μm in size. These graphene thin films, being optically transparent and electrically conducting, are intended for applications such as the touch screen (to replace indium-tin oxide or ITO glass) or semiconductor (to replace silicon, Si). Furthermore, the Ni- or Cu-catalyzed CVD process does not lend itself to the deposition of more than 5 graphene planes (typically <2 nm) beyond which the underlying Ni or Cu catalyst can no longer provide any catalytic effect. There has been no experimental evidence to indicate that CVD graphene layer thicker than 5 nm is possible.

Thus, it is an object of the present invention to provide a process for producing graphene oxide (GO)-derived bulk highly oriented graphene structure, which exhibits a thermal conductivity, electrical conductivity, elastic modulus, and/or tensile strength that is comparable to or greater than those of the HOPG, CVD graphene film, and/or flexible graphite.

It is another object of the present invention to provide a process for producing GO-derived bulk highly oriented graphene structure (thicker than 0.1 mm, preferably thicker than 0.2 mm, more preferably thicker than 0.5 mm, further more preferably with a thickness in the mm range, and most preferably in the centimeter range) that exhibit a combination of exceptional thermal conductivity, electrical conductivity, mechanical strength, and elastic modulus unmatched by any material of comparable thickness range.

SUMMARY OF THE INVENTION

The present invention provides a process for producing a bulk highly oriented graphene structure (HOGS) with a thickness greater than 0.1 mm (more typically >0.2 mm, further more typically >0.5 mm, even more typically >1 mm, still more typically >5 mm, and most typically >10 mm). There is no theoretical limit on the thickness of the HOGS that can be produced using the presently invented process. This is not a process intended for producing thin films, which are typically defined as having a thickness less than 100 μm or 0.1 mm. The process includes:

(a) preparing either a graphene oxide dispersion (GO suspension) having graphene oxide sheets dispersed in a fluid medium or a GO gels having GO molecules dissolved in a fluid medium, wherein the GO sheets or GO molecules contain an oxygen content higher than 5% by weight (typically higher than 10%, more typically higher than 20%, often higher than 30%, and can be up to approximately 50% by weight);

(b) dispensing and depositing the GO dispersion or GO gel onto a surface of a supporting solid substrate to form a first layer of graphene oxide having a thickness less than 2 mm (preferably less than 1.0 mm, more preferably less than 0.5 mm, and most preferably less than 0.2 mm), wherein the dispensing and depositing procedure includes subjecting the graphene oxide dispersion to an orientation-inducing stress;

(c) partially or completely removing the fluid medium from the first layer of graphene oxide to form a first dried layer of graphene oxide having an inter-plane spacing $d_{002}$ of 0.4 nm to 1.2 nm as determined by X-ray diffraction and an oxygen content no less than 5% by weight;

(d) preparing at least a second layer of dried graphene oxide by repeating steps (b) and (c) at least one time or simply by slicing the first dried layer into multiple pieces of dried graphene oxide;

(e) stacking the first layer of dried graphene oxide with the at least second layer of dried graphene oxide (or stacking multiple pieces of dried graphene oxide prepared by slicing) under an optional first compressive stress to form a mass of multiple layers of graphene oxide; and (f) heat treating the mass of multiple layers or pieces of dried graphene oxide under an optional second compressive stress to produce the highly oriented graphene structure at a first heat treatment temperature higher than 100° C. to an extent that an inter-plane spacing $d_{002}$ is decreased to a value less than 0.4 nm and the oxygen content is decreased to less than 5% by weight, wherein said step (f) occurs before, during, or after said step (e).

In an embodiment, the fluid medium further contains pristine graphene sheets and a pristine graphene to graphene oxide ratio is from 1/100 to 100/1.

It may be noted that the step (d) of preparing at least a second dried layer of graphene oxide may be done by simply slicing the first dried layer into multiple pieces of dried graphene oxide. The dried layer of graphene oxide may be advantageously prepared in a roll-to-roll manner with a desired width and length, sufficient to be cut into many pieces.

It may be further noted that step (e) of stacking and step (f) of heat treating may be conducted sequentially or concurrently. In one embodiment, the process includes (i) heat treating multiple layers or pieces of dried graphene oxide, separately or simultaneously, at a first heat treatment temperature higher than 100° C. to an extent that an inter-plane spacing $d_{002}$ in any of the dried graphene layer or piece is decreased to a value less than 0.4 nm and the oxygen content is decreased to less than 5% by weight; and (ii) stacking multiple layers or pieces of heat-treated graphene oxide under a first compressive stress to form the highly oriented graphene structure. The order of conducting stacking and heat-treating steps may be reversed.

The orientation-inducing stress may be a shear stress. As an example, the shear stress can be encountered in a situation as simple as a "doctor's blade" that guides the spreading of GO dispersion or GO gel over a plastic or glass surface during a manual casting process. As another example, an effective orientation-inducing stress is created in an automated roll-to-roll coating process in which a "knife-on-roll" configuration dispenses GO dispersion or GO gel over a moving solid substrate, such as a plastic film. The relative motion between this moving film and the coating knife acts to effect orientation of graphene sheets along the shear stress direction.

This orientation-inducing stress is a critically important step in the production of the presently invented HOGS due to the surprising observation that the shear stress enables the GO sheets or GO molecules to align themselves along a particular direction (e.g. X-direction or length-direction) or two particular directions (e.g. X- and Y-directions or length and width directions) to produce preferred orientations. Further surprisingly, these preferred orientations are preserved and often further enhanced during the subsequent heat treatment of the GO compact (multiple layers of orientation-controlled GO stacked and compressed together) to produce the highly oriented graphene structure. Most surprisingly, such preferred orientations are essential to the eventual attainment of exceptionally high thermal conductivity, electrical conductivity, elastic modulus, and tensile or flexural strength of the resulting HOGS along a desired direction. These great properties in this desired direction could not be obtained without such a shear stress-induced orientation control.

In an embodiment, the invention provides a process for producing a highly oriented graphene structure with a thickness no greater than 0.1 mm, which process comprises: (a) preparing a pristine graphene dispersion having oxygen-free pristine graphene sheets dispersed in a fluid medium; (b) dispensing and depositing the pristine graphene dispersion onto a surface of a supporting substrate to form a layer of pristine graphene, wherein the dispensing and depositing procedure includes subjecting the pristine graphene dispersion to an orientation-inducing stress; (c) partially or completely removing the fluid medium from the layer of pristine graphene to form a dried layer of pristine graphene; (d) slicing the dried layer of pristine graphene into multiple pieces of dried pristine graphene or repeating steps (b) and (c) to produce multiple layers of dried pristine graphene, and stacking at least two pieces or two layers of dried pristine graphene under an optional first compressive stress to form a mass of multiple pieces of pristine graphene; and (e) heat-treating the mass of multiple pieces or layers of dried pristine graphene at a first heat treatment temperature higher than 2,000° C. under a second compressive stress for a sufficient period of time to produce the highly oriented graphene structure.

During the coating or casting procedure in all versions of the presently invented process, the thickness of the coated or cast films (layers) cannot be too high, otherwise a high degree of GO or graphene sheet orientation cannot be achieved. In general, the coated or cast films (wet layers) must be sufficiently thin that when they become dried, they form a dried layer of graphene oxide having a thickness no greater than 100 μm, preferably no greater than 50 μm, more preferably no greater than 30 μm, further preferably no greater than 20 μm, and most preferably no greater than 10 μm. Through extensive and in-depth experimental studies we have come to unexpectedly realize that the thinner these dried orientation-controlled GO layers, the higher the degree of GO sheet orientation and the higher in-plane thermal conductivity and electrical conductivity of the resulting HOGS. A high degree of GO plane orientation cannot be achieved if one simply cast a very thick mass of GO suspension or GO gel, drying the mass, compacting the mass (using a uniaxial compressive stress), and heat-treating the compact. The resulting graphitic structure, not a HOGS, does not have the desired degree of graphene plane orientation and its thermal conductivity and electrical conductivity are no better than those of a structure prepared by stacking and compressing multiple sheets of flexible graphite foil.

In an embodiment, step (f) further includes heat-treating the graphene oxide mass at a second heat treatment temperature higher than 280° C. for a length of time sufficient for decreasing an inter-plane spacing $d_{002}$ to a value of from 0.3354 nm to 0.36 nm and decreasing the oxygen content to less than 2% by weight.

In an embodiment, the fluid medium consists of water and/or an alcohol. It is highly advantageous that the fluid medium does not contain any obnoxious chemical.

In a preferred embodiment, the second (or final) heat treatment temperature includes at least a temperature selected from (A) 300-1,500° C., (B) 1,500-2,100° C., and/or (C) higher than 2,100° C. Preferably, the second heat treatment temperature includes a temperature in the range of 300-1,500° C. for at least 1 hour and then a temperature in the range of 1,500-3,200° C. for at least another hour.

The process typically involves at least 3 layers of dried graphene oxide together and more typically a large number of layers or pieces of dried graphene oxide, preferably under a compressive stress. There is no limitation on the number of layers that can be stacked and then chemically linked together to become a single integrated entity (not just an aggregate of discrete graphene sheets). This is truly unexpected.

In one embodiment, the graphene oxide dispersion has at least 1% (preferably at least 3% and often greater than 5%) by weight of graphene oxide dispersed in the fluid medium. When the weight percentage of GO sheets exceeds at least 5% by weight, these sheets appear to form a liquid crystal phase.

The graphene oxide dispersion or GO gel is prepared by immersing a graphitic material in a powder or fibrous form in an oxidizing liquid in a reaction vessel at a reaction temperature for a length of time sufficient to obtain said graphene oxide dispersion wherein said graphitic material is selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof and wherein said graphene oxide has an oxygen content no less than 5% by weight.

In a preferred embodiment, steps (b) and (c) include feeding a sheet of a solid substrate material from a roller to a deposition zone, depositing a layer of GO dispersion or GO gel onto a surface of the sheet of solid substrate material to form the graphene oxide layer thereon, drying the GO dispersion or GO gel to form the dried graphene oxide layer deposited on the substrate surface, and collecting the dried graphene oxide layer-deposited substrate sheet on a collector roller. This is a roll-to-roll or reel-to-reel process that can be conducted on a continuous basis.

In one embodiment, wherein the first and/or second heat treatment temperature contains a temperature in the range of 500° C.-1,500° C., the resulting highly oriented graphene structure has an oxygen content less than 1%, an inter-graphene spacing less than 0.345 nm, a thermal conductivity of at least 1,000 W/mK, and/or an electrical conductivity no less than 3,000 S/cm.

In another embodiment, wherein the first and/or second heat treatment temperature contains a temperature in the range of 1,500° C.-2,100° C., the highly oriented graphene structure has an oxygen content less than 0.01%, an inter-graphene spacing less than 0.337 nm, a thermal conductivity of at least 1,300 W/mK, and/or an electrical conductivity no less than 5,000 S/cm.

In a preferred embodiment, wherein the first and/or second heat treatment temperature contains a temperature greater than 2,100° C., the highly oriented graphene structure has an oxygen content no greater than 0.001%, an inter-graphene spacing less than 0.336 nm, a mosaic spread value no greater than 0.7, a thermal conductivity of at least 1,500 W/mK, and/or an electrical conductivity no less than 10,000 S/cm.

In another preferred embodiment, wherein the first and/or second heat treatment temperature contains a temperature no less than 2,500° C., the highly oriented graphene structure has an inter-graphene spacing less than 0.336 nm, a mosaic spread value no greater than 0.4, a thermal conductivity greater than 1,600 W/mK, and/or an electrical conductivity greater than 10,000 S/cm.

Typically, the highly oriented graphene structure exhibits an inter-graphene spacing less than 0.337 nm and a mosaic spread value less than 1.0. More typically, the highly oriented graphene structure exhibits a degree of graphitization no less than 80% (preferably and more typically no less than 90%) and/or a mosaic spread value less than 0.4.

Due to the notion that highly aligned GO sheets or GO molecules can be chemically merged together in an edge-to-edge manner, the resulting highly oriented graphene structure has a grain size that is significantly larger than the maximum grain size of the starting graphitic material prior to or during oxidation of the graphitic material. In other words, if the graphene oxide dispersion is obtained from a graphitic material having a maximum original graphite grain size, then the resulting highly oriented graphene structure is normally a single crystal or a poly-crystal graphene structure having a grain size larger than this maximum original grain size.

Internal structure-wise, the highly oriented graphene structure contains chemically bonded graphene planes that are parallel to one another. The graphene oxide dispersion is typically obtained from a graphitic material having multiple graphite crystallites exhibiting no preferred crystalline orientation as determined by an X-ray diffraction or electron diffraction method. However, the highly oriented graphene structure is typically a single crystal or a poly-crystal graphene structure having a preferred crystalline orientation as determined by said X-ray diffraction or electron diffraction method. In some cases, the highly oriented graphene structure contains a combination of $sp^2$ and $sp^3$ electronic configurations. In the invented process, the step of heat-treating induces chemical linking, merging, or chemical bonding of graphene oxide molecules, and/or re-graphitization or re-organization of a graphitic structure.

The invented process typically results in a highly oriented graphene structure that has an electrical conductivity greater than 5,000 S/cm, a thermal conductivity greater than 800 W/mK, a physical density greater than 1.9 g/cm3, a flexural strength greater than 100 MPa, and/or an elastic modulus greater than 60 GPa. More typically, the highly oriented graphene structure has an electrical conductivity greater than 8,000 S/cm, a thermal conductivity greater than 1,200 W/mK, a physical density greater than 2.0 g/cm3, a flexural strength greater than 140 MPa, and/or an elastic modulus greater than 80 GPa. Still more typically, the highly oriented graphene structure has an electrical conductivity greater than 12,000 S/cm, a thermal conductivity greater than 1,500 W/mK, a physical density greater than 2.1 $g/cm^3$, a flexural strength greater than 160 MPa, and/or an elastic modulus greater than 120 GPa.

The present invention also provides a highly oriented graphene structure produced by using any version of the presently invented process. The present invention further provides a thermal management device that contains a highly oriented graphene structure produced by using any version of the presently invented process.

This new class of materials (i.e., a GO-derived highly oriented graphene structure) has the following characteristics (separately or in combination) that distinguish themselves from HOPG, stacked flexible graphite sheets, and stacked paper/film/membrane sheets of discrete graphene/GO/RGO sheets/platelets:

(1) This HOGS is an integrated graphene entity that is either a graphene single crystal (single grain only) or a poly-crystal (multiple grains with exceptionally large grain sizes). The highly oriented graphene structure has all the graphene planes in all the grains being essentially oriented parallel to one another (i.e., the crystallographic c-axis of all grains essentially pointing in an identical direction).

(2) The HOGS is an integrated graphene entity that is not a simple aggregate or stack of multiple discrete graphite flakes or discrete platelets of graphene/GO/RGO, and does not contain any discernible or discrete flake/platelet derived from the original GO sheets. These originally discrete flakes or platelets have been chemically bonded or linked together to form larger grains (grain size being larger than the original platelet/flake size).

(3) This HOGS is not made by using a binder or adhesive to glue discrete flakes or platelets together. Instead, under select heat treatment conditions, well-aligned GO sheets or GO molecules are capable of chemically merging with one another mainly in an edge-to-edge manner to form giant 2-D graphene grains, but possibly also with adjacent GO sheets below or above to form 3-D networks of graphene chains Through joining or forming of covalent bonds with one another, the GO sheets are adhered into an integrated graphene entity, without using any externally added linker or binder molecules or polymers.

(4) This HOGS, a single crystal or poly-crystal with essentially all graphene planes having an identical crystallographic c-axis, is derived from GO, which is in turn obtained from moderate or heavy oxidation of natural graphite or artificial graphite particles each originally having multiple graphite crystallites that are randomly oriented. Prior to being chemically oxidized to become GO dispersion (moderate-to-heavy oxidation of graphite) or GO gel (heavy oxidation for a sufficiently long oxidation time to achieve fully separated GO molecules dissolved in water or other polar liquid), these starting or original graphite crystallites have an initial length ($L_a$ in the crystallographic a-axis direction), initial width ($L_b$ in the b-axis direction), and thickness ($L_c$ in the c-axis direction). The resulting HOGS typically has a length or width significantly greater than the $L_a$ and $L_b$ of the original graphite crystallites.

(5) This process involves significantly lower heat treatment temperatures and lower pressure as compared with the processes for producing HOPG from either carbonized polymers (e.g. polyimide) or the CVD graphite. The presently invented process is simpler (hence, more reliable), faster, less energy-intensive, and highly scalable.

(6) This process for producing a bulk GO-derived HOGS can be conducted on a continuous roll-to-roll basis and, hence, is much more cost-effective. No other process is known to be capable of producing HOPG structures on a continuous basis.

DESCRIPTION OF THE PREFERRED EMBODIMENTS

Figure 1A:
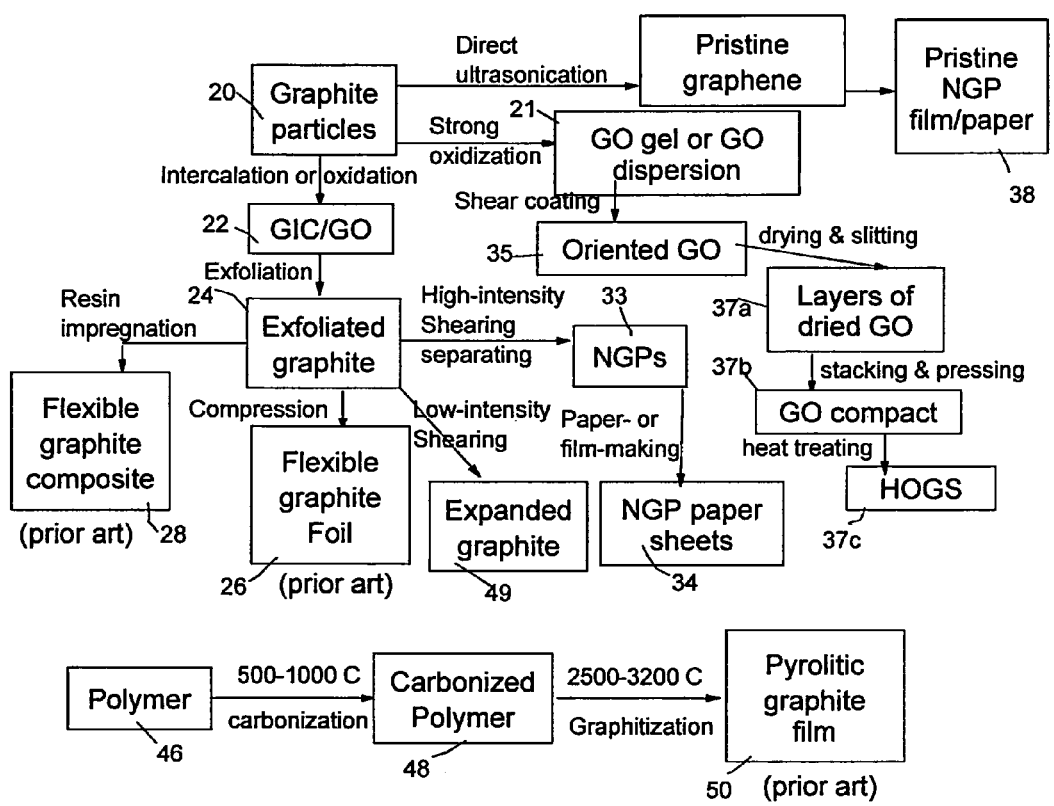
FIG. 1 (A) A flow chart illustrating various prior art processes of producing exfoliated graphite products (flexible graphite foils and flexible graphite composites) and pyrolytic graphite (bottom portion), along with a process for producing graphene oxide gel or GO dispersion 21, oriented GO layer 35, layers of dried GO 37a, GO compact 37b obtained by stacking and compressing multiple layers or pieces of dried GO, and HOGS 37c; (B) Schematic drawing illustrating the processes for producing conventional paper, mat, film, and membrane of simply aggregated graphite or NGP flakes/platelets. All processes begin with intercalation and/or oxidation treatment of graphitic materials (e.g. natural graphite particles).

The present invention provides a process for producing a bulk highly oriented graphene structure with a thickness greater than 0.2 mm (more typically >0.5 mm, even more typically >1 mm, further more typically >5 mm, and most typically >10 mm). The process includes:

(a) preparing either a graphene oxide (GO) dispersion having graphene oxide sheets dispersed in a fluid medium or a GO gel having GO molecules dissolved in a fluid medium, wherein the GO sheets or GO molecules contain an oxygen content higher than 5% by weight (typically higher than 10%, more typically higher than 20%, often higher than 30%, and can be up to approximately 50% by weight). Graphene oxide (GO) sheets are preferably single-layer or few-layer graphene sheets (up to 10 layers of graphene planes of carbon atoms) having edge- and surface-borne oxygen-containing functional groups. These O-containing functional groups enable good dispersion or dissolution of GO sheets in a more environmentally benign fluid medium, such as water and/or alcohol (methanol, ethanol, propanol, etc.).

(b) dispensing and depositing the GO dispersion or GO gel onto a surface of a supporting solid substrate to form a first layer of graphene oxide having a thickness less than 2 mm (preferably less than 1 mm, more preferably less than 0.5 mm, and most preferably less than 0.2 mm), wherein the dispensing and depositing procedure include subjecting the graphene oxide dispersion or GO gel to an orientation-inducing stress;

(c) partially or completely removing the fluid medium from the first layer of graphene oxide to form a first layer of dried graphene oxide having an inter-plane spacing $d_{002}$ of 0.4 nm to 1.2 nm as determined by X-ray diffraction and an oxygen content no less than 5% by weight;

(d) preparing at least a second layer of dried graphene oxide by repeating steps (b) and (c) at least one time or simply by slicing the first dried layer into multiple pieces of dried graphene oxide;

(e) stacking the first layer of dried graphene oxide with the at least second layer of dried graphene oxide (or multiple pieces of dried graphene oxide prepared by slicing) under an optional first compressive stress to form a mass of multiple layers of dried graphene oxide; and (f) heat treating the mass of multiple layers or pieces of dried graphene oxide under an optional second compressive stress to produce the highly oriented graphene structure at a first heat treatment temperature higher than 100° C. to an extent that an inter-plane spacing $d_{002}$ is decreased to a value less than 0.4 nm and the oxygen content is decreased to less than 5% by weight, wherein said step (f) occurs before, during, or after said step (e).

In an embodiment, step (f) further includes heat-treating the graphene oxide mass at a second heat treatment temperature higher than the first heat treatment temperature and higher than 280° C. for a length of time sufficient for decreasing an inter-plane spacing $d_{002}$ to a value of from 0.3354 nm to 0.36 nm and decreasing the oxygen content to less than 2% by weight (most preferably between 0.001% to 0.01% by weight).

In a preferred embodiment, the second (or final) heat treatment temperature includes at least a temperature selected from (A) 100-300° C., (B) 300-1,500° C., (C) 1,500-2,500° C., and/or (D) higher than 2,500° C. Preferably, the second heat treatment temperature includes a temperature in the range of 300-1,500° C. for at least 1 hour and then a temperature in the range of 1,500-3,200° C. for at least another hour.

The highly oriented graphene structure contains chemically bonded and merged graphene planes. These planar aromatic molecules or graphene planes (hexagonal structured carbon atoms having a small amount of oxygen-containing group) are parallel to one another. The lateral dimensions (length or width) of these planes are huge, typically several times or even orders of magnitude larger than the maximum crystallite dimension (or maximum constituent graphene plane dimension) of the starting graphite particles. The presently invented bulk highly oriented graphene structure is a "giant graphene crystal" or "giant graphene particle" having all constituent graphene planes being essentially parallel to one another. This is a unique and new class of material that has not been previously discovered, developed, or suggested to possibly exist.

The oriented graphene oxide layer is itself a very unique and novel class of material that surprisingly has great cohesion power (self-bonding, self-polymerizing, and self-crosslinking capability). These characteristics have not been taught or hinted in the prior art. The GO is obtained by immersing powders or filaments of a starting graphitic material in an oxidizing liquid medium (e.g. a mixture of sulfuric acid, nitric acid, and potassium permanganate) in a reaction vessel. The starting graphitic material may be selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof.

When the starting graphite powders or filaments are mixed in the oxidizing liquid medium, the resulting slurry is a heterogeneous suspension and appears dark and opaque. When the oxidation of graphite proceeds at a reaction temperature for a sufficient length of time, the reacting mass can eventually become a suspension that appears slightly green and yellowish, but remain opaque. If the degree of oxidation is sufficiently high (e.g. having an oxygen content between 20% and 50% by weight, preferably between 30% and 50%) and all the original graphene planes are fully oxidized, exfoliated and separated to the extent that each oxidized graphene plane (now a graphene oxide sheet or molecule) is surrounded by the molecules of the liquid medium, one obtains a GO gel. The GO gel is optically translucent and is essentially a homogeneous solution, as opposed to a heterogeneous suspension.

This GO suspension or GO gel typically contains some excess amount of acids and can be advantageously subjected to some acid dilution treatment to increase the pH value (preferably >4.0). The GO suspension (dispersion) preferably contain at least 1% by weight of GO sheets dispersed in a liquid medium, more preferably at least 3% by weight, and most preferably at least 5% by weight. It is advantageous to have an amount of GO sheets sufficient for forming a liquid crystalline phase. We have surprisingly observed that GO sheets in a liquid crystal state have the highest tendency to get readily oriented under the influence of a shear stress created by a commonly used casting or coating process.

In step (b), the GO suspension is formed into a GO layer preferably under the influence of a shear stress. One example of such a shearing procedure is casting or coating a thin film of GO suspension or GO gel using a coating machine. This procedure is similar to a layer of varnish, paint, coating, or ink being coated onto a solid substrate. The roller, "doctor's blade", or wiper creates a shear stress when the film is shaped, or when there is a relative motion between the roller/blade/wiper and the supporting substrate. Quite unexpectedly and significantly, such a shearing action enables the planar GO sheets or GO molecules to well align along, for instance, a shearing direction. Further surprisingly, such a molecular alignment state or preferred orientation is not disrupted when the liquid components in the GO suspension or GO gel are subsequently removed to form a well-packed layer of highly aligned GO sheets that are at least partially dried. The dried GO mass has a high birefringence coefficient between an in-plane direction and the normal-to-plane direction.

In an embodiment, the above-described procedure is repeated to produce another layer of dried GO whose constituent GO sheets are also well-aligned. In an alternative embodiment, a layer of dried GO is sliced (slit) into multiple pieces of dried GO of comparable dimensions. Subsequently, there are two main routes of thermal-mechanical procedures to follow: In a first route, multiple pieces or layers of dried GO are then stacked together to form a stacked structure, which is compressed to form a GO compact. This compact is then subjected to a heat treatment to produce a heat-treated compact that involves at least a first (initial) heat treatment temperature greater than 80° C., preferably greater than 100° C., more preferably greater than 280-300° C., further more preferably greater than 500° C. and can be as high as 1,500° C.

In a second route, individual layers or pieces of dried GO are treated at a first heat treatment temperature for a desired length of time, and multiple layers or pieces of heat-treated GO are then compressed to form a heat-treated compact. In either the first or the second route, the heat-treated compact is then subjected to a further heat treatment that involves at least a second temperature that is significantly higher than the first heat treatment temperature.

A properly programmed heat treatment procedure can involve just a single heat treatment temperature (e.g. a first heat treatment temperature only), at least two heat treatment temperatures (first temperature for a period of time and then raised to a second temperature and maintained at this second temperature for another period of time), or any other combination of heat treatment temperatures that involve an initial treatment temperature (first temperature) and a final heat treatment temperature, higher than the first. The highest or final heat treatment temperature that the GO mass experiences may be divided into four distinct heat treatment temperature (HIT) regimes:

Regime 1 (up to 300° C.): In this temperature range (the thermal reduction regime), a GO mass (an individual GO layer or a pre-stacked and compressed compact of multiple GO layers) primarily undergoes thermally-induced reduction reactions, leading to a reduction of oxygen content from typically 20-50% (as dried) to approximately 5-6%. This treatment results in a reduction of inter-graphene spacing from approximately 0.6-1.2 nm (as dried) down to approximately 0.4 nm, and an increase in in-plane thermal conductivity from approximately 100 W/mK to 450 W/mK. Even with such a low temperature range, some chemical linking occurs. The GO molecules remain well-aligned, but the inter-GO spacing remains relatively large (0.4 nm or larger). Many O-containing functional groups survive.

Regime 2 (300° C.-1,500° C.): In this chemical linking regime, extensive chemical combination, polymerization, and cross-linking between adjacent GO sheets or GO molecules occur. The oxygen content is reduced to typically 0.7% (<<1%) after chemical linking, resulting in a reduction of inter-graphene spacing to approximately 0.345 nm. This implies that some initial graphitization has already begun at such a low temperature, in stark contrast to conventional graphitizable materials (such as carbonized polyimide film) that typically require a temperature as high as 2,500° C. to initiate graphitization. This is another distinct feature of the presently invented HOGS and its production processes. These chemical linking reactions result in an increase in in-plane thermal conductivity to 800-1,200 W/mK, and/or in-plane electrical conductivity to 3,000-4,000 S/cm.

Regime 3 (1,500-2,500° C.): In this ordering and re-graphitization regime, extensive graphitization or graphene plane merging occurs, leading to significantly improved degree of structural ordering. As a result, the oxygen content is reduced to typically 0.01% and the inter-graphene spacing to approximately 0.337 nm (achieving degree of graphitization from 1% to approximately 80%, depending upon the actual HTT and length of time). The improved degree of ordering is also reflected by an increase in in-plane thermal conductivity to >1,200-1,500 W/mK, and/or in-plane electrical conductivity to 5,000-7,000 S/cm.

Regime 4 (higher than 2,500° C.): In this re-crystallization and perfection regime, extensive movement and elimination of grain boundaries and other defects occur, resulting in the formation of nearly perfect single crystals or poly-crystalline graphene crystals with huge grains, which can be orders of magnitude larger than the original grain sizes of the starting graphite particles for the production of GO suspension. The oxygen content is essentially eliminated, typically 0%-0.001%. The inter-graphene spacing is reduced to down to approximately 0.3354 nm (degree of graphitization from 80% to nearly 100%), corresponding to that of a perfect graphite single crystal. Quite interestingly, the graphene poly-crystal has all the graphene planes being closely packed and bonded, and all the planes are aligned along one direction, a perfect orientation. Such a perfectly oriented structure has not been produced even with the HOPG that was produced by subjecting pyrolytic graphite concurrently to an ultra-high temperature (3,400° C.) under an ultra-high pressure (300 Kg/cm$^2$). The highly oriented graphene structure can achieve such a highest degree of perfection with a significantly lower temperature and an ambient (or slightly higher compression) pressure. The structure thus obtained exhibits an in-plane thermal conductivity up to slightly >1,700 W/mK, and in-plane electrical conductivity to a range from 15,000 to 20,000 S/cm.

The presently invented highly oriented graphene structure can be obtained by heat-treating the stacked multiple layers of dried GO with a temperature program that covers at least the first regime (typically requiring 1-4 hours in this temperature range if the temperature never exceeds 500° C.), more commonly covers the first two regimes (1-2 hours preferred), still more commonly the first three regimes (preferably 0.5-2.0 hours in Regime 3), and most commonly all the 4 regimes (Regime 4, for 0.2 to 1 hour, may be implemented to achieve the highest conductivity).

X-ray diffraction patterns were obtained with an X-ray diffractometer equipped with CuKcv radiation. The shift and broadening of diffraction peaks were calibrated using a silicon powder standard. The degree of graphitization, g, was calculated from the X-ray pattern using the Mering's Eq, $d_{002}=0.3354 g+0.344 (1-g)$, where $d_{002}$ is the interlayer spacing of graphite or graphene crystal in nm. This equation is valid only when $d_{002}$ is equal or less than approximately 0.3440 nm. The HOGS having a $d_{002}$ higher than 0.3440 nm reflects the presence of oxygen-containing functional groups (such as —OH, >O, and —COOH on graphene molecular plane surfaces) that act as a spacer to increase the inter-graphene spacing.

Another structural index that can be used to characterize the degree of ordering of the presently invented HOGS and conventional graphite crystals is the "mosaic spread," which is expressed by the full width at half maximum of a rocking curve (X-ray diffraction intensity) of the (002) or (004) reflection. This degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Most of our HOGS samples have a mosaic spread value in this range of 0.2-0.4 (if produced with a heat treatment temperature (HTT) no less than 2,500° C.). However, some values are in the range of 0.4-0.7 if the HTT is between 1,500 and 2,500° C., and in the range of 0.7-1.0 if the HTT is between 300 and 1,500° C.

The graphene oxide suspension may be prepared by immersing a graphitic material (in a powder or fibrous form) in an oxidizing liquid to form a reacting slurry in a reaction vessel at a reaction temperature for a length of time sufficient to obtain graphene oxide (GO) sheets dispersed in a residual liquid. Typically, this residual liquid is a mixture of acid (e.g. sulfuric acid) and oxidizer (e.g. potassium permanganate or hydrogen peroxide). This residual liquid is then washed and replaced with water and/or alcohol to produce a GO dispersion wherein discrete GO sheets (single-layer or multi-layer GO) are dispersed in the fluid. The dispersion is a heterogeneous suspension of discrete GO sheets suspended in a liquid medium and it looks optically opaque and dark (relatively low degree of oxidation) or slightly green and yellowish (if the degree of oxidation is high).

Now, if the GO sheets contain a sufficient amount of oxygen-containing functional groups and the resulting dispersion (suspension or slurry) is mechanically sheared or ultrasonicated to produce individual GO sheets or molecules that are dissolved (not just dispersed) in water and/or alcohol or other polar solvent, we can reach a material state called "GO gel" in which all individual GO molecules are surrounded by the molecules of the liquid medium. The GO gel looks like a homogeneous solution which is translucent and no discernible discrete GO or graphene sheets can be visibly identified. Useful starting graphitic materials include natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof. As the oxidizing reaction proceeds to a critical extent and individual GO sheets are fully separated (now with graphene plane and edges being heavily decorated with oxygen-containing groups), an optically transparent or translucent solution is formed, which is the GO gel.

Preferably, the GO sheets in such a GO dispersion or the GO molecules in such a GO gel are in the amount of 1%-15% by weight, but can be higher or lower. More preferably, the GO sheets are 2%-10% by weight in the suspension. Most preferably, the amount of GO sheets is sufficient to form a liquid crystal phase in the dispersing liquid. The GO sheets have an oxygen content typically in the range from 5% to 50% by weight, more typically from 10% to 50%, and most typically from 20% to 46% by weight.

The graphene oxide suspension- or GO gel-derived bulk (non-thin film) highly oriented graphene structure (HOGS) has the following characteristics:

(1) The bulk HOGS (>>100 μm, and more typically >>200 μm in thickness) is an integrated graphene oxide or oxygen-free graphene structure that is typically a poly-crystal having large grains. The HOGS has wide/long chemically bonded graphene planes that are all essentially oriented parallel to one another. In other words, the crystallographic c-axis directions of all the constituent graphene planes in all grains are essentially pointing in the same direction.

(2) The HOGS is a fully integrated, essentially void-free, single graphene entity or monolith containing no discrete flakes or platelets derived from the GO suspension. In contrast, the paper-like sheets of exfoliated graphite worms (i.e., flexible graphite foils), mats of expanded graphite flakes (>100 nm in thickness), and paper or membrane of graphene or GO platelets (<100 nm) are a simple, un-bonded aggregate/stack of multiple discrete graphite flakes or discrete platelets of graphene, GO, or RGO. The flakes or platelets in these paper/membrane/mats are poorly oriented and have lots of kinks, bends, and wrinkles. Many voids or other defects are present in these paper/membrane/mats.

(3) In prior art processes, discrete graphene sheets (<<100 nm, typically <10 nm) or expanded graphite flakes (>100 nm) that constitute the original structure of graphite particles could be obtained via expanding, exfoliating, and separating treatments. By simply mixing and re-compressing these discrete sheets/flakes into a bulk object, one could attempt to orient these sheets/flakes hopefully along one direction through compression. However, with these conventional processes, the constituent flakes or sheets of the resulting aggregate would remain as discrete flakes/sheets/platelets that can be easily discerned or clearly observed even with an un-assisted eye or under a low-magnification optical microscope (×100-×1000).

In contrast, the preparation of the presently invented HOGS involves heavily oxidizing the original graphite particles, to the extent that practically every one of the original graphene planes has been oxidized and isolated from one another to become individual molecules that possess highly reactive functional groups (e.g. —OH, >O, and —COOH) at the edge and, mostly, on graphene planes as well. These individual hydrocarbon molecules (containing elements such as O and H, in addition to carbon atoms) are dispersed in a liquid medium (e.g. mixture of water and alcohol) to form a GO dispersion. This dispersion is then cast or coated onto a smooth substrate surface, typically under shear stress field conditions, and the liquid components are then removed to form a dried GO layer. Multiple layers of the dried GO are stacked and compacted together to form a GO bulk. When heated, these highly reactive molecules react and chemically join with one another mostly in lateral directions along graphene planes (in an edge-to-edge manner) and, in some cases, between graphene planes as well.

Figure 3A:
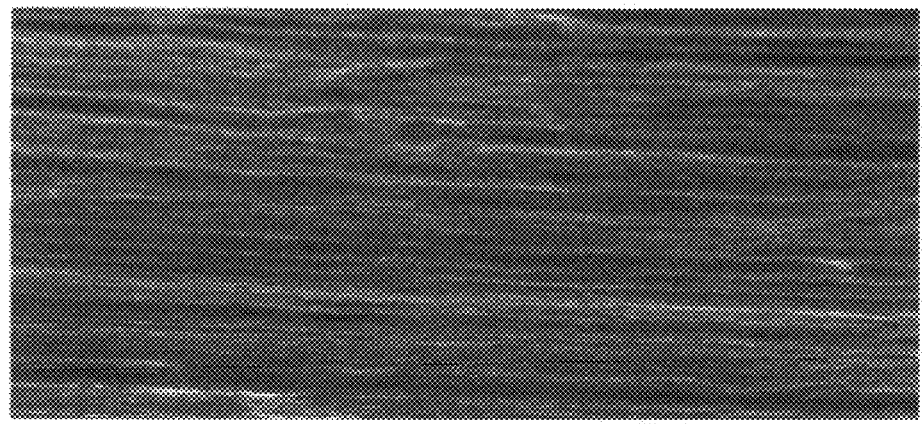
FIG. 3 (A) A SEM image of a GO-derived HOGS, wherein multiple graphene planes (having an initial length/width of 30 nm-300 nm in original graphite particles) have been oxidized, exfoliated, re-oriented, and seamlessly merged into continuous-length graphene sheets or layers that can run for tens of centimeters wide or long (only a 50 µm width of a 10-cm wide HOGS being shown in this SEM image); (B) A SEM image of a cross-section of a conventional graphene paper/film prepared from discrete graphene sheets/platelets using a paper-making process (e.g. vacuum-assisted filtration). The image shows many discrete graphene sheets being folded or interrupted (not integrated), with orientations not parallel to the film/paper surface and having many defects or imperfections; (C) Schematic drawing and an attendant SEM image to illustrate the formation process of a HOGS that is composed of multiple graphene planes that are parallel to one another and are chemically bonded in the thickness-direction or crystallographic c-axis direction; and (D) One plausible chemical linking mechanism (only 2 GO molecules are shown as an example; a large number of GO molecules can be chemically linked together to form a graphene layer).
Figure 3B:
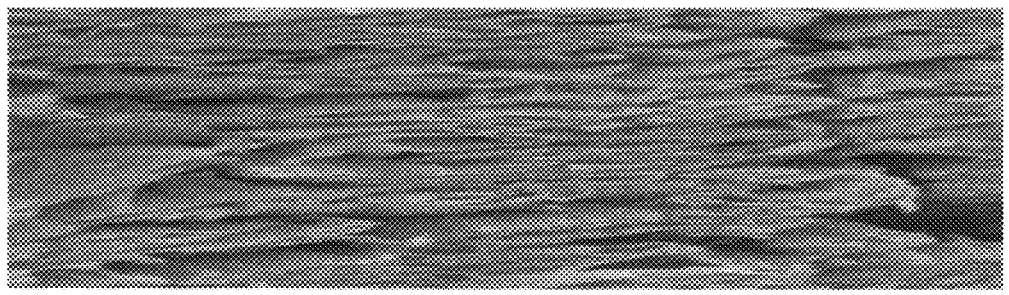
Figure 3C:
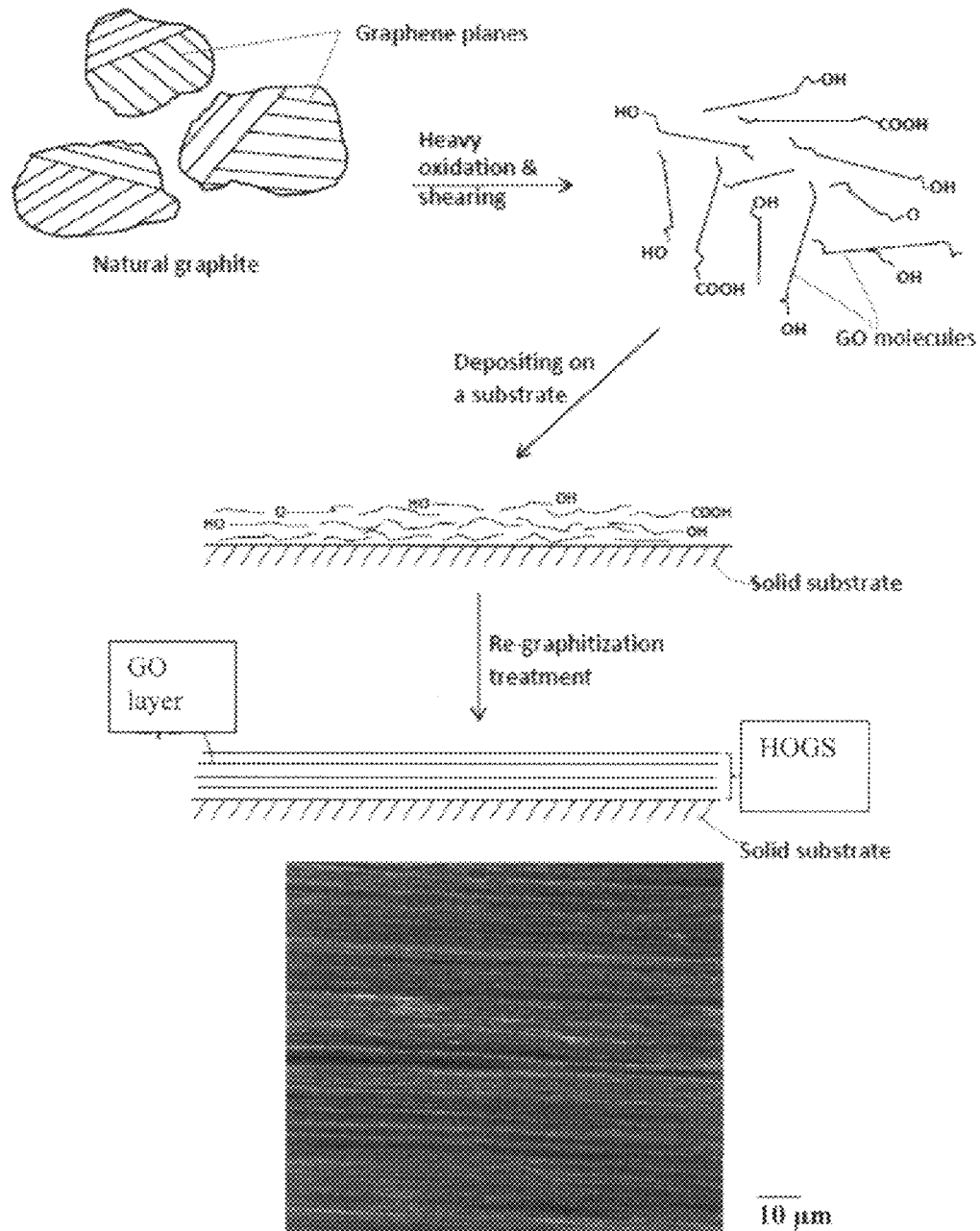
Figure 3D:
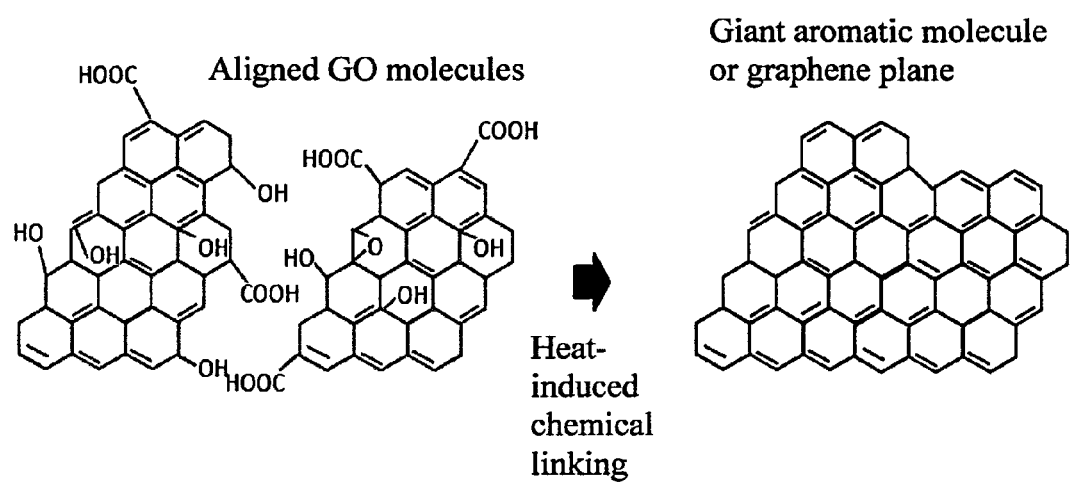

Illustrated in FIG. 3(d) is a plausible chemical linking mechanism where only 2 aligned GO molecules are shown as an example, although a large number of GO molecules can be chemically linked together to form a HOGS. Further, chemical linking could also occur face-to-face, not just edge-to-edge. These linking and merging reactions proceed in such a manner that the molecules are chemically merged, linked, and integrated into one single entity. The molecules (GO sheets) completely lose their own original identity and they no longer are discrete sheets/platelets/flakes. There is only one single layer-like structure that is essentially a network of interconnected giant molecules with an essentially infinite molecular weight. This may also be described as a graphene poly-crystal (with several grains, but typically no discernible, well-defined grain boundaries). All the constituent graphene planes are very large in lateral dimensions (length and width) and, if constituent layers of dried GO are stacked, compacted, and heat-treated at a higher temperature (e.g. >1,500° C. or much higher), these graphene planes are essentially bonded together with one another and aligned parallel to one another.

In-depth studies using a combination of SEM, TEM, selected area diffraction, X-ray diffraction, AFM, Raman spectroscopy, and FTIR indicate that the HOGO is composed of several huge graphene planes (with length/width typically >>100 μm, more typically >>1 mm, and most typically >>1 cm). These giant graphene planes are stacked and bonded along the thickness direction (crystallographic c-axis direction) often through not just the van der Waals forces (as in conventional graphite crystallites), but also covalent bonds, if the final heat treatment temperature is lower than 2,500° C. In these cases, wishing not to be limited by theory, but Raman and FTIR spectroscopy studies appear to indicate the co-existence of $sp^2$ (dominating) and $sp^a$ (weak but existing) electronic configurations, not just the conventional $sp^2$ in graphite.

(4) This HOGS is not made by gluing or bonding discrete flakes/platelets together with a resin binder, linker, or adhesive. Instead, GO sheets (molecules) in the GO dispersion or GO gel are merged through joining or forming of covalent bonds with one another, into an integrated graphene entity, without using any externally added linker or binder molecules or polymers.

(5) This HOGS is typically a poly-crystal composed of large grains having incomplete grain boundaries, typically with the crystallographic c-axis in all grains being essentially parallel to each other. This entity is derived from a GO suspension or GO gel, which is in turn obtained from natural graphite or artificial graphite particles originally having multiple graphite crystallites. Prior to being chemically oxidized, these starting graphite crystallites have an initial length ($L_a$ in the crystallographic a-axis direction), initial width ($L_b$ in the b-axis direction), and thickness ($L_c$ in the c-axis direction). Upon heavy oxidation, these initially discrete graphite particles are chemically transformed into highly aromatic graphene oxide molecules having a significant concentration of edge- or surface-borne functional groups (e.g. —OH, —COOH, etc.). These aromatic GO molecules in the GO suspension have lost their original identity of being part of a graphite particle or flake. Upon removal of the liquid component from the suspension, the resulting GO molecules form an essentially amorphous structure. Upon heat treatments, these GO molecules are chemically merged and linked into a unitary or monolithic graphene entity that is highly ordered.

The resulting unitary graphene entity typically has a length or width significantly greater than the $L_a$ and $L_b$ of the original crystallites. The length/width of this HOGS is significantly greater than the $L_a$ and $L_b$ of the original crystallites. Even the individual grains in a poly-crystalline HOGS have a length or width significantly greater than the $L_a$ and $L_b$ of the original crystallites. They can be as large as the length or width of the HOGS itself, not just 2 or 3 times higher than the initial $L_a$ and $L_b$ of the original crystallites.

(6) Due to these unique chemical composition (including oxygen content), morphology, crystal structure (including inter-graphene spacing), and structural features (e.g. high degree of orientations, few defects, incomplete grain boundaries, chemical bonding and no gap between graphene sheets, and no interruptions in graphene planes), the graphene oxide-derived HOGS has a unique combination of outstanding thermal conductivity, electrical conductivity, mechanical strength, and stiffness (elastic modulus).

The aforementioned features are further described and explained in detail as follows: As illustrated in FIG. 1(B), a graphite particle (e.g. 100) is typically composed of multiple graphite crystallites or grains. A graphite crystallite is made up of layer planes of hexagonal networks of carbon atoms. These layer planes of hexagonally arranged carbon atoms are substantially flat and are oriented or ordered so as to be substantially parallel and equidistant to one another in a particular crystallite. These layers of hexagonal-structured carbon atoms, commonly referred to as graphene layers or basal planes, are weakly bonded together in their thickness direction (crystallographic c-axis direction) by weak van der Waals forces and groups of these graphene layers are arranged in crystallites. The graphite crystallite structure is usually characterized in terms of two axes or directions: the c-axis direction and the a-axis (or b-axis) direction. The c-axis is the direction perpendicular to the basal planes. The a- or b-axes are the directions parallel to the basal planes (perpendicular to the c-axis direction).

A highly ordered graphite particle can consist of crystallites of a considerable size, having a length of $L_a$ along the crystallographic a-axis direction, a width of $L_b$ along the crystallographic b-axis direction, and a thickness $L_c$ along the crystallographic c-axis direction. The constituent graphene planes of a crystallite are highly aligned or oriented with respect to each other and, hence, these anisotropic structures give rise to many properties that are highly directional. For instance, the thermal and electrical conductivity of a crystallite are of great magnitude along the plane directions (a- or b-axis directions), but relatively low in the perpendicular direction (c-axis). As illustrated in the upper-left portion of FIG. 1(B), different crystallites in a graphite particle are typically oriented in different directions and, hence, a particular property of a multi-crystallite graphite particle is the directional average value of all the constituent crystallites.

Due to the weak van der Waals forces holding the parallel graphene layers, natural graphite can be treated so that the spacing between the graphene layers can be appreciably opened up so as to provide a marked expansion in the c-axis direction, and thus form an expanded graphite structure in which the laminar character of the carbon layers is substantially retained. The process for manufacturing flexible graphite is well-known in the art. In general, flakes of natural graphite (e.g. 100 in FIG. 1(B)) are intercalated in an acid solution to produce graphite intercalation compounds (GICs, 102). The GICs are washed, dried, and then exfoliated by exposure to a high temperature for a short period of time. This causes the flakes to expand or exfoliate in the c-axis direction of the graphite up to 80-300 times of their original dimensions. The exfoliated graphite flakes are vermiform in appearance and, hence, are commonly referred to as worms 104. These worms of graphite flakes which have been greatly expanded can be formed without the use of a binder into cohesive or integrated sheets of expanded graphite, e.g. webs, papers, strips, tapes, foils, mats or the like (typically referred to as "flexible graphite" 106) having a typical density of about 0.04-2.0 g/cm³ for most applications.

Figure 1B:
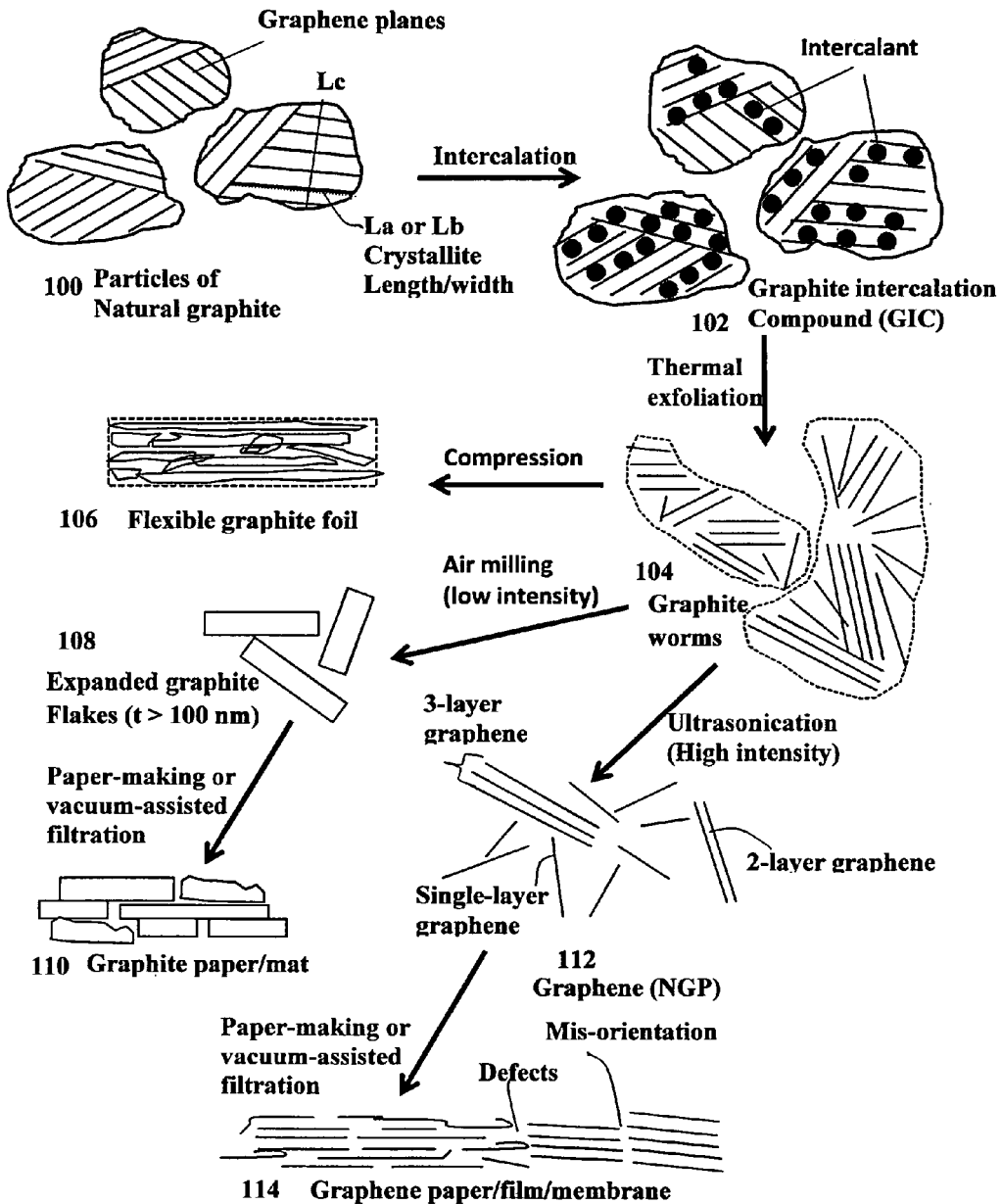

The upper left portion of FIG. 1(A) shows a flow chart that illustrates the prior art processes used to fabricate flexible graphite foils and the resin-impregnated flexible graphite composite. The processes typically begin with intercalating graphite particles 20 (e.g., natural graphite or synthetic graphite) with an intercalant (typically a strong acid or acid mixture) to obtain a graphite intercalation compound 22 (GIC). After rinsing in water to remove excess acid, the GIC becomes "expandable graphite." The GIC or expandable graphite is then exposed to a high temperature environment (e.g., in a tube furnace preset at a temperature in the range of 800-1,050° C.) for a short duration of time (typically from 15 seconds to 2 minutes). This thermal treatment allows the graphite to expand in its c-axis direction by a factor of 30 to several hundreds to obtain a worm-like vermicular structure 24 (graphite worm), which contains exfoliated, but un-separated graphite flakes with large pores interposed between these interconnected flakes. An example of graphite worms is presented in FIG. 2(A).

In one prior art process, the exfoliated graphite (or mass of graphite worms) is re-compressed by using a calendaring or roll-pressing technique to obtain flexible graphite foils (26 in FIG. 1(A) or 106 in FIG. 1(B)), which are typically 100-300 μm thick. An SEM image of a cross-section of a flexible graphite foil is presented in FIG. 2(B), which shows many graphite flakes with orientations not parallel to the flexible graphite foil surface and there are many defects and imperfections.

Largely due to these mis-orientations of graphite flakes and the presence of defects, commercially available flexible graphite foils normally have an in-plane electrical conductivity of 1,000-3,000 S/cm, through-plane (thickness-direction or Z-direction) electrical conductivity of 15-30 S/cm, in-plane thermal conductivity of 140-300 W/mK, and through-plane thermal conductivity of approximately 10-30 W/mK. These defects and mis-orientations are also responsible for the low mechanical strength (e.g. defects are potential stress concentration sites where cracks are preferentially initiated). These properties are inadequate for many thermal management applications and the present invention is made to address these issues.

In another prior art process, the exfoliated graphite worm 24 may be impregnated with a resin and then compressed and cured to form a flexible graphite composite 28, which is normally of low strength as well. In addition, upon resin impregnation, the electrical and thermal conductivity of the graphite worms could be reduced by two orders of magnitude.

Alternatively, the exfoliated graphite may be subjected to high-intensity mechanical shearing/separation treatments using a high-intensity air jet mill, high-intensity ball mill, or ultrasonic device to produce separated nano graphene platelets 33 (NGPs) with all the graphene platelets thinner than 100 nm, mostly thinner than 10 nm, and, in many cases, being single-layer graphene (also illustrated as 112 in FIG. 1(B)). An NGP is composed of a graphene sheet or a plurality of graphene sheets with each sheet being a two-dimensional, hexagonal structure of carbon atoms.

Further alternatively, with a low-intensity shearing, graphite worms tend to be separated into the so-called expanded graphite flakes (108 in FIG. 1(B) having a thickness >100 nm. These flakes can be formed into graphite paper or mat 106 using a paper- or mat-making process. This expanded graphite paper or mat 106 is just a simple aggregate or stack of discrete flakes having defects, interruptions, and mis-orientations between these discrete flakes.

For the purpose of defining the geometry and orientation of an NGP, the NGP is described as having a length (the largest dimension), a width (the second largest dimension), and a thickness. The thickness is the smallest dimension, which is no greater than 100 nm, preferably smaller than 10 nm in the present application. When the platelet is approximately circular in shape, the length and width are referred to as diameter. In the presently defined NGPs, both the length and width can be smaller than 1 µm, but can be larger than 200 µm.

A mass of multiple NGPs (including discrete sheets/platelets of single-layer and/or few-layer graphene or graphene oxide, 33 in FIG. 1(A)) may be made into a graphene film/paper (34 in FIG. 1(A) or 114 in FIG. 1(B)) using a film- or paper-making process. FIG. 3(B) shows a SEM image of a cross-section of a graphene paper/film prepared from discrete graphene sheets using a paper-making process. The image shows the presence of many discrete graphene sheets being folded or interrupted (not integrated), most of platelet orientations being not parallel to the film/paper surface, the existence of many defects or imperfections. NGP aggregates, even when being closely packed, exhibit a thermal conductivity higher than 1,000 W/mK only when the film or paper is cast and strongly pressed into a sheet having a thickness lower than 10 µM. A heat spreader in many electronic devices is normally required to be thicker than 10 µm based mainly on handling ease and structural integrity considerations.

Another graphene-related product is the graphene oxide gel 21 (FIG. 1(A)). This GO gel is obtained by immersing a graphitic material 20 in a powder or fibrous form in a strong oxidizing liquid in a reaction vessel to form a suspension or slurry, which initially is optically opaque and dark. This optical opacity reflects the fact that, at the outset of the oxidizing reaction, the discrete graphite flakes and, at a later stage, the discrete graphene oxide flakes scatter and/or absorb visible wavelengths, resulting in an opaque and generally dark fluid mass. If the reaction between graphite powder and the oxidizing agent is allowed to proceed at a sufficiently high reaction temperature for a sufficient length of time and all the resulting GO sheets are fully separated, this opaque suspension is transformed into a brown-colored and typically translucent or transparent solution, which is now a homogeneous fluid called "graphene oxide gel" (21 in FIG. 1(A)) that contains no discernible discrete graphite flakes or graphite oxide platelets. If dispensed and deposited under a shear stress field, the GO gel undergoes molecular orientation to form a layer of "oriented GO" 35, which can be dried to obtain a layer of dried GO 37a. Multiple layers of dried GO may be compressed to obtain dried GO compact 37b, which can be heat-treated to become a HOGS 37c.

Again, typically, this graphene oxide gel is optically transparent or translucent and visually homogeneous with no discernible discrete flakes/platelets of graphite, graphene, or graphene oxide dispersed therein. In the GO gel, the GO molecules are uniformly "dissolved" in an acidic liquid medium. In contrast, suspension of discrete graphene sheets or graphene oxide sheets in a fluid (e.g. water, organic acid or solvent) look dark, black or heavy brown in color with individual graphene or graphene oxide sheets discernible or recognizable even with naked eyes or using a low-magnification light microscope (100×-1,000×). We are quite surprised to observe that suspension of GO sheets, even not in a GO gel state, can be used to produce the HOGS that is thick. In many cases, compared to GO gel, the GO suspension can lead to better oriented GO sheets, resulting in a HOGS that exhibits better electrical and mechanical properties.

Further, even though graphene oxide suspension or GO gel is obtained from a graphitic material (e.g. powder of natural graphite) having multiple graphite crystallites exhibiting no preferred crystalline orientation, as determined by an X-ray diffraction or electron diffraction method, the resulting HOGS exhibits a very high degree of preferred crystalline orientation as determined by the same X-ray diffraction or electron diffraction method. This is yet another piece of evidence to indicate that the constituent graphene planes of hexagonal carbon atoms that constitute the particles of the original or starting graphitic material have been chemically modified, converted, re-arranged, re-oriented, linked or cross-linked, merged and integrated, re-graphitized, and even re-crystallized.

Example 1

Preparation of Discrete Nano Graphene Platelets (NGPs) which are GO Sheets

Chopped graphite fibers with an average diameter of 12 µm and natural graphite particles were separately used as a starting material, which was immersed in a mixture of concentrated sulfuric acid, nitric acid, and potassium permanganate (as the chemical intercalate and oxidizer) to prepare graphite intercalation compounds (GICs). The starting material was first dried in a vacuum oven for 24 h at 80° C. Then, a mixture of concentrated sulfuric acid, fuming nitric acid, and potassium permanganate (at a weight ratio of 4:1:0.05) was slowly added, under appropriate cooling and stirring, to a three-neck flask containing fiber segments. After 5-16 hours of reaction, the acid-treated graphite fibers or natural graphite particles were filtered and washed thoroughly with deionized water until the pH level of the solution reached 6. After being dried at 100° C. overnight, the resulting graphite intercalation compound (GIC) or graphite oxide fiber was re-dispersed in water and/or alcohol to form a slurry.

In one sample, five grams of the graphite oxide fibers were mixed with 2,000 ml alcohol solution consisting of alcohol and distilled water with a ratio of 15:85 to obtain a slurry mass. Then, the mixture slurry was subjected to ultrasonic irradiation with a power of 200 W for various lengths of time. After 20 minutes of sonication, GO fibers were effectively exfoliated and separated into thin graphene oxide sheets with oxygen content of approximately 23%-31% by weight. The resulting suspension was then cast onto a glass surface using a doctor's blade to exert shear stresses, inducing GO sheet orientations. The resulting GO coating films, after removal of liquid, have a thickness that can be varied from approximately 10 to 500 µm (preferably <100 µm).

For making a HOGS specimen, a desired number of dried GO films (layers) were then stacked and compressed using a roll-press. The resulting GO compact was then subjected to heat treatments that typically involve an initial thermal reduction temperature of 80-350° C. for 1-8 hours, followed by heat-treating at a second temperature of 1,500-2,850° C.

Figure 8:
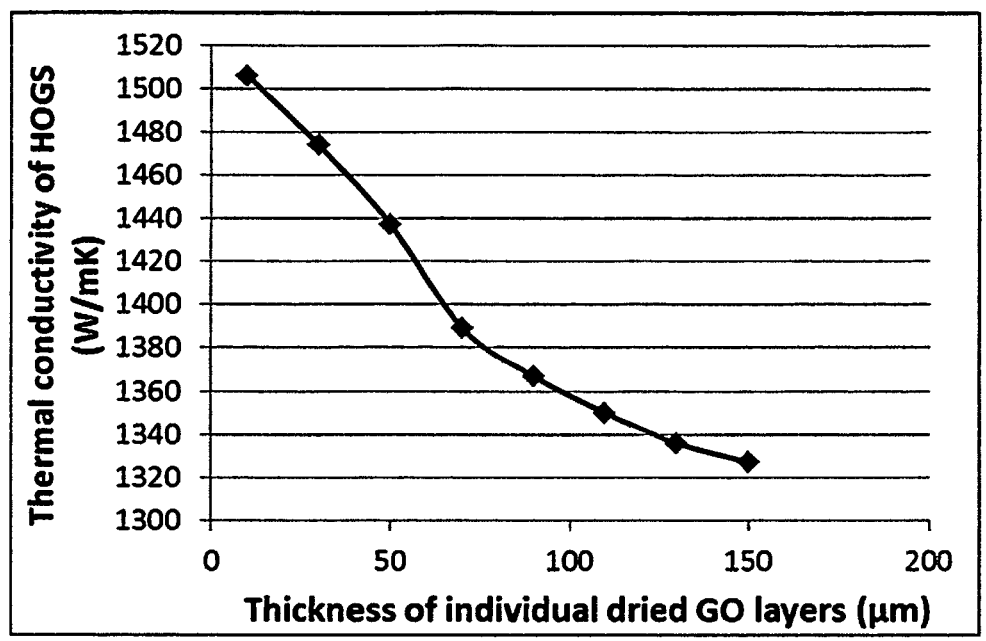
FIG. 8 Thermal conductivity of HOGS samples (prepared with a final heat treatment temperature of 1,500° C. and a final thickness of approximately 0.3 mm) plotted as a function of the thickness value of the individual GO layers.

We typically chose to work with thinner coating layers (10-50 µm) since, surprisingly, they were found to have a higher degree of graphene or GO sheet orientation. These led to better HOGS structures as we surprisingly found after some experiments. The data shown in FIG. 8 indicates that a lower thickness value of the individual GO coating or casting layers led to a higher thermal conductivity of a HOGS having a final heat treatment temperature of 1,500° C. and a final thickness of approximately 0.3 mm for all samples tested. For further comparison, we poured (cast) a comparable GO solution into a bulk mold cavity of 5 cm×5 cm×5 cm to produce a GO casting which was dried and compressed under a uniaxial stress to produce a GO compact. This compact was subjected to identical thermal treatments as in those samples shown in FIG. 8. The result was quite shockingly different. The bulk structure is highly porous with constituent GO sheets being very poorly oriented and incapable of chemical merging and linking with one another (large number of small grains). The in-plane thermal conductivity was only <100 W/mK. These observations demonstrate the unexpected effectiveness of using the presently invented layer-by-layer approach of producing a fully integrated HOGS structure by preparing, stacking, compressing, and heat-treating thin layers of GO. Such a strategy has never been previously taught or hinted.

Example 2

Preparation of Single-Layer Graphene Sheets from Meso-Carbon Micro-Beads (MCMBs)

Meso-carbon microbeads (MCMBs) were supplied from China Steel Chemical Co., Kaohsiung, Taiwan. This material has a density of about 2.24 g/cm³ with a median particle size of about 16 μm. MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was no less than 4.5. The slurry was then subjected ultrasonication for 10-100 minutes to produce GO suspensions. TEM and atomic force microscopic studies indicate that most of the GO sheets were single-layer graphene when the oxidation treatment exceeded 72 hours, and 2- or 3-layer graphene when the oxidation time was from 48 to 72 hours.

The GO sheets contain oxygen proportion of approximately 35%-47% by weight for oxidation treatment times of 48-96 hours. The suspension was then cast onto a glass surface using a doctor's blade to exert shear stresses, inducing GO sheet orientations. The resulting GO films, after removal of liquid, have a thickness that can be varied from approximately 10 to 500 μm.

For making a HOGS specimen, a desired number of dried GO films were then stacked and compressed using a roll-press. The resulting GO compact was then subjected to heat treatments that typically involve an initial thermal reduction temperature of 80-500° C. for 1-5 hours, followed by heat-treating at a second temperature of 1,500-2,850° C.

Example 3

Preparation of Graphene Oxide (GO) Suspension and GO Gel from Natural Graphite

Graphite oxide was prepared by oxidation of graphite flakes with an oxidizer liquid consisting of sulfuric acid, sodium nitrate, and potassium permanganate at a ratio of 4:1:0.05 at 30° C. When natural graphite flakes (particle sizes of 14 μm) were immersed and dispersed in the oxidizer mixture liquid for 48 hours, the suspension or slurry appears and remains optically opaque and dark. After 48 hours, the reacting mass was rinsed with water 3 times to adjust the pH value to at least 3.0. A final amount of water was then added to prepare a series of GO-water suspensions. We observed that GO sheets form a liquid crystal phase when GO sheets occupy a weight fraction >3% and typically from 5% to 15%.

For comparison purposes, we also have prepared GO gel samples by extending the oxidation times to approximately 96 hours. With continued heavy oxidation, the dark-colored, opaque suspension obtained with 48 hours of oxidation turns into a brown-yellowish solution that is translucent upon rinsing with some water.

By dispensing and coating the GO suspension or the GO gel on a polyethylene terephthalate (PET) film in a slurry coater and removing the liquid medium from the coated film we obtained a thin film of dried graphene oxide. Each film was slit and trimmed into multiple pieces of dried GO, which were stacked and compressed to form a GO compact. Several GO compacts were then subjected to different heat treatments, which typically include a thermal reduction treatment at a first temperature of 100° C. to 500° C. for 1-10 hours, and at a second temperature of 1,500° C.-2,850° C. for 0.5-5 hours. With these heat treatments, also under a compressive stress, the GO compact was transformed into a HOGS.

Figure 5A:
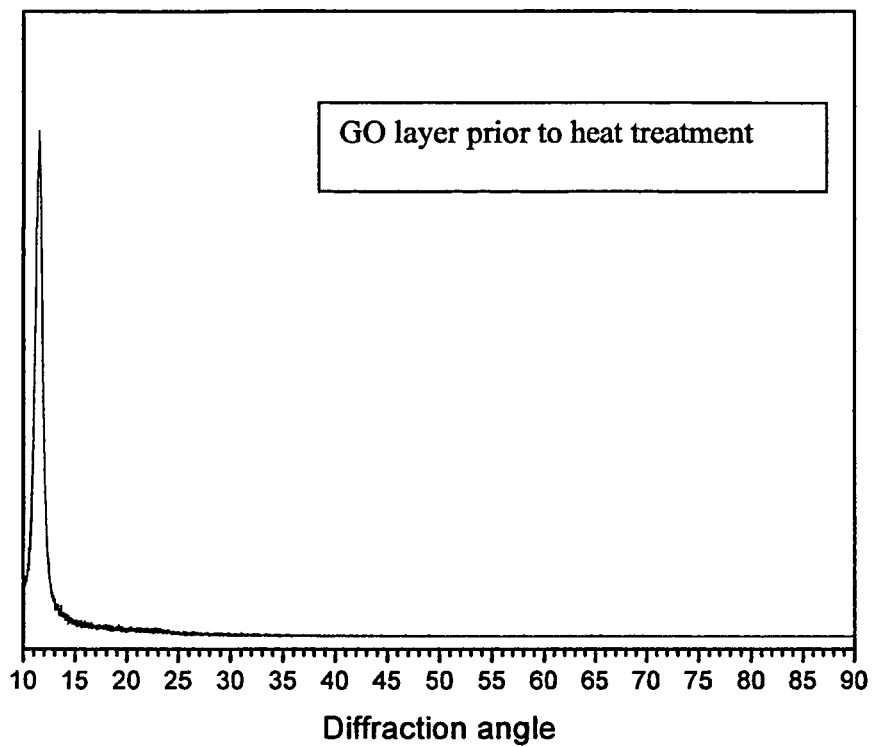
FIG. 5 X-ray diffraction curves of (A) a GO layer, (B) GO layer thermally reduced at 150° C. (partially reduced), (C) reduced and re-graphitized bulk HOGS, (D) highly re-graphitized and re-crystallized HOGS showing a high-intensity (004) peak, and (E) a polyimide-derived HOPG with a HTT as high as 3,000° C.
Figure 5B:
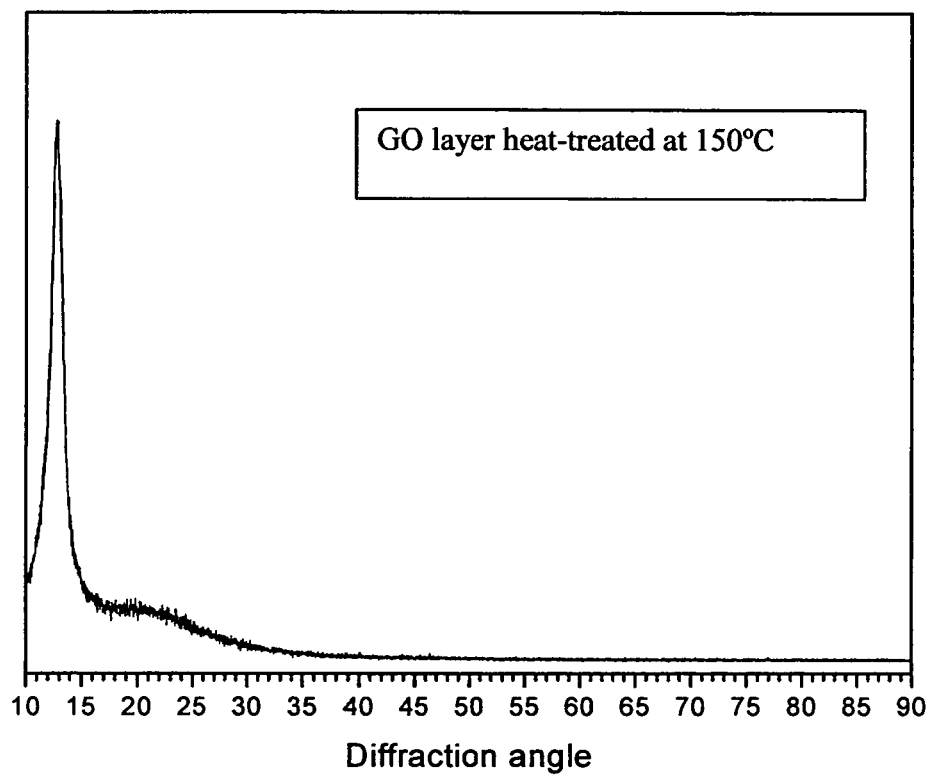
Figure 5C:
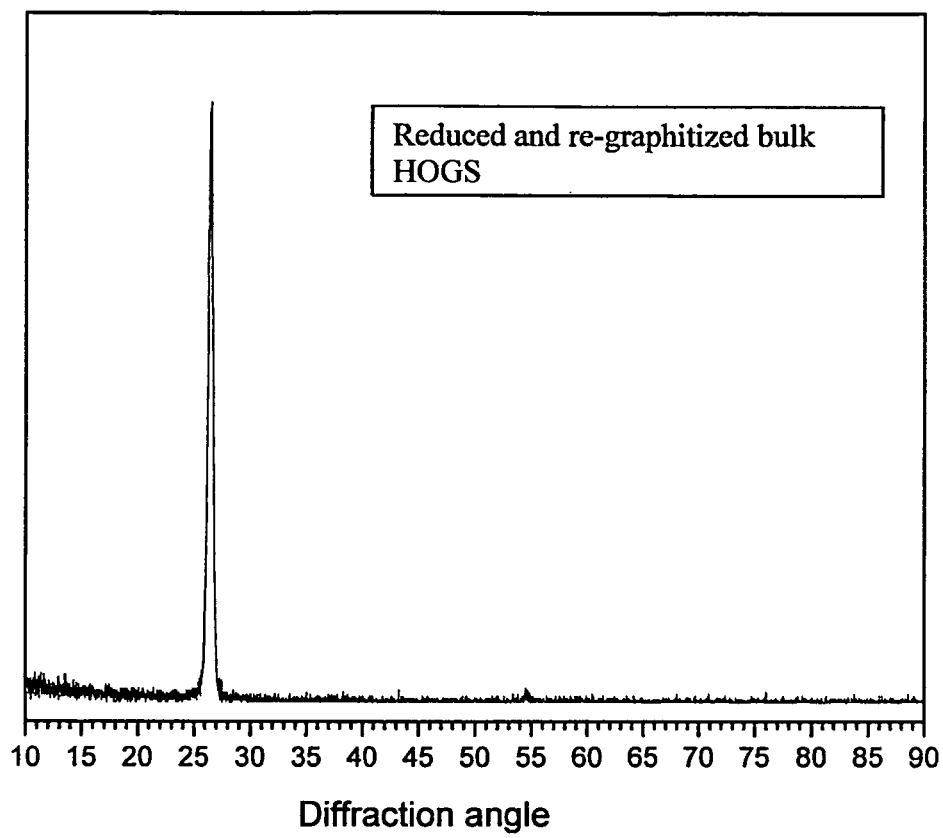

The internal structures (crystal structure and orientation) of several dried GO layers, GO compacts each made of multiple pieces of dried GO layers, and the HOGS at different stages of heat treatments were investigated. X-ray diffraction curves of a layer of dried GO prior to a heat treatment, a GO compact thermally reduced at 150° C. for one hour, and a HOGS are shown in FIGS. 5(A), 5(B), and 5(C), respectively. The peak at approximately $2\theta=12°$ of the dried GO layer (FIG. 5(A)) corresponds to an inter-graphene spacing ($d_{002}$) of approximately 0.7 nm. With some heat treatment at 150° C., the dried GO compact exhibits the formation of a hump centered at 22° (FIG. 5(B)), indicating that it has begun the process of decreasing the inter-graphene spacing, indicating the beginning of chemical linking and ordering processes. With a heat treatment temperature of 2,500° C. for one hour, the $d_{002}$ spacing has decreased to approximately 0.336, close to 0.3354 nm of a graphite single crystal.

Figure 5D:
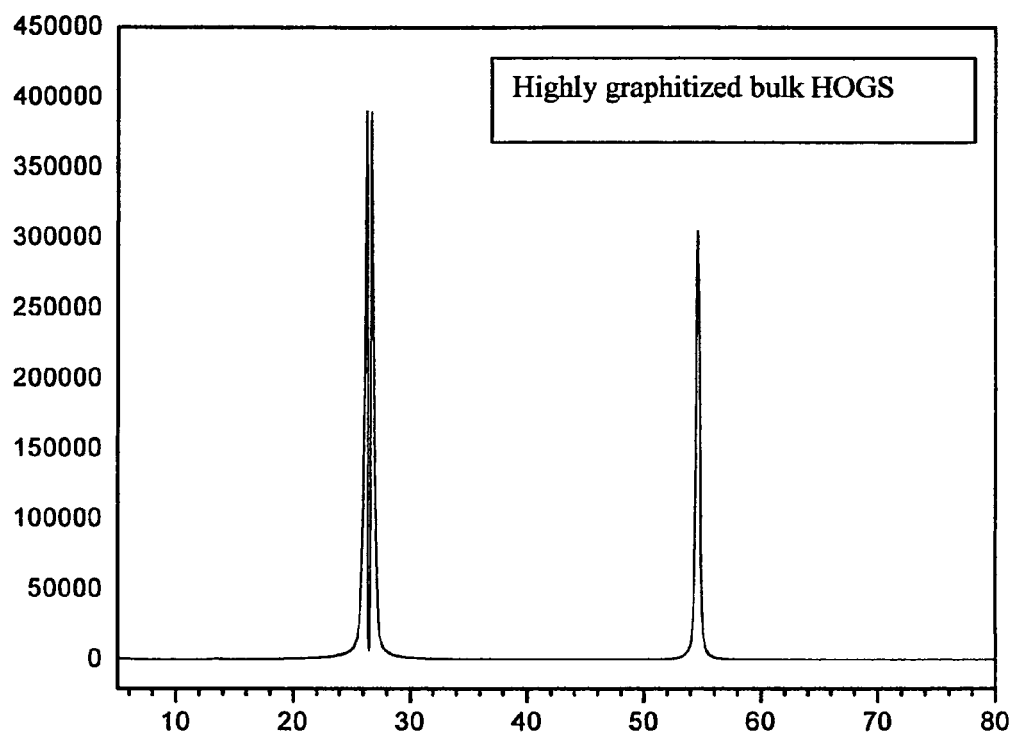
Figure 5E:
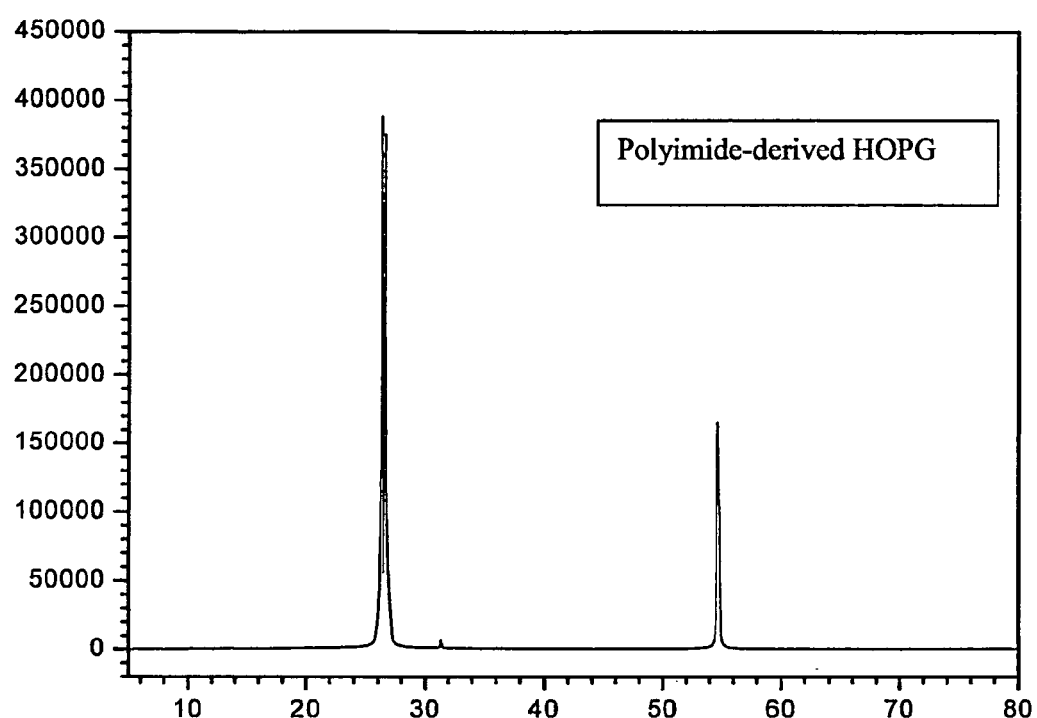

With a heat treatment temperature of 2,750° C. for one hour, the $d_{002}$ spacing is decreased to approximately to 0.3354 nm, identical to that of a graphite single crystal. In addition, a second diffraction peak with a high intensity appears at $2\theta=55°$ corresponding to X-ray diffraction from (004) plane (FIG. 5(D)). The (004) peak intensity relative to the (002) intensity on the same diffraction curve, or the I(004)/I(002) ratio, is a good indication of the degree of crystal perfection and preferred orientation of graphene planes. The (004) peak is either non-existing or relatively weak, with the I(004)/I(002) ratio <0.1, for all graphitic materials heat treated at a temperature lower than 2,800° C. The I(004)/I(002) ratio for the graphitic materials heat treated at 3,000-3,250° C. (e,g, highly oriented pyrolytic graphite, HOPG) is in the range of 0.2-0.5. One example is presented in FIG. 5(E) for a polyimide-derived PG with a HTT of 3,000° C. for two hours, which exhibits a I(004)/I(002) ratio of about 0.41. In contrast, a HOGS prepared with a final HTT of 2,750° C. for one hour exhibits a I(004)/I(002) ratio of 0.78 and a Mosaic spread value of 0.21, indicating a practically perfect graphene single crystal with an exceptional degree of preferred orientation.

The "mosaic spread" value is obtained from the full width at half maximum of the (002) reflection in an X-ray diffraction intensity curve. This index for the degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Most of our HOGS have a mosaic spread value in this range of 0.2-0.4 when produced using a final heat treatment temperature no less than 2,500° C.

It may be noted that the I(004)/I(002) ratio for all tens of flexible graphite foil compacts investigated are all <<0.05, practically non-existing in most cases. The I(004)/I(002) ratio for all graphene paper/membrane samples prepared with a vacuum-assisted filtration method is <0.1 even after a heat treatment at 3,000° C. for 2 hours. These observations have further confirmed the notion that the presently invented HOGS is a new and distinct class of material that is fundamentally different from any pyrolytic graphite (PG), flexible graphite (FG), and paper/film/membrane of conventional graphene/GO/RGO sheets/platelets (NGPs).

Figure 6A:
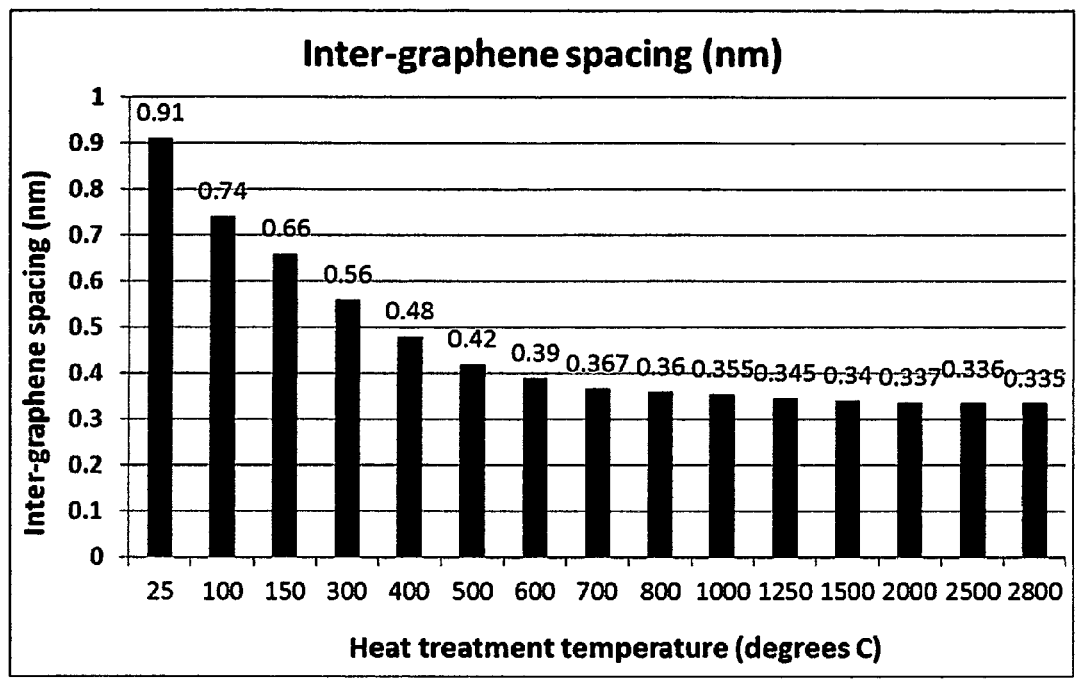
FIG. 6 (A) Inter-graphene plane spacing measured by X-ray diffraction; (B) the oxygen content in the GO suspension-derived HOGS; (C) correlation between inter-graphene spacing and the oxygen content; and (D) thermal conductivity of GO dispersion-derived HOGS, GO gel-derived HOGS, and stacked sheets of flexible graphite (FG) foil, all plotted as a function of the final heat treatment temperature.
Figure 6B:
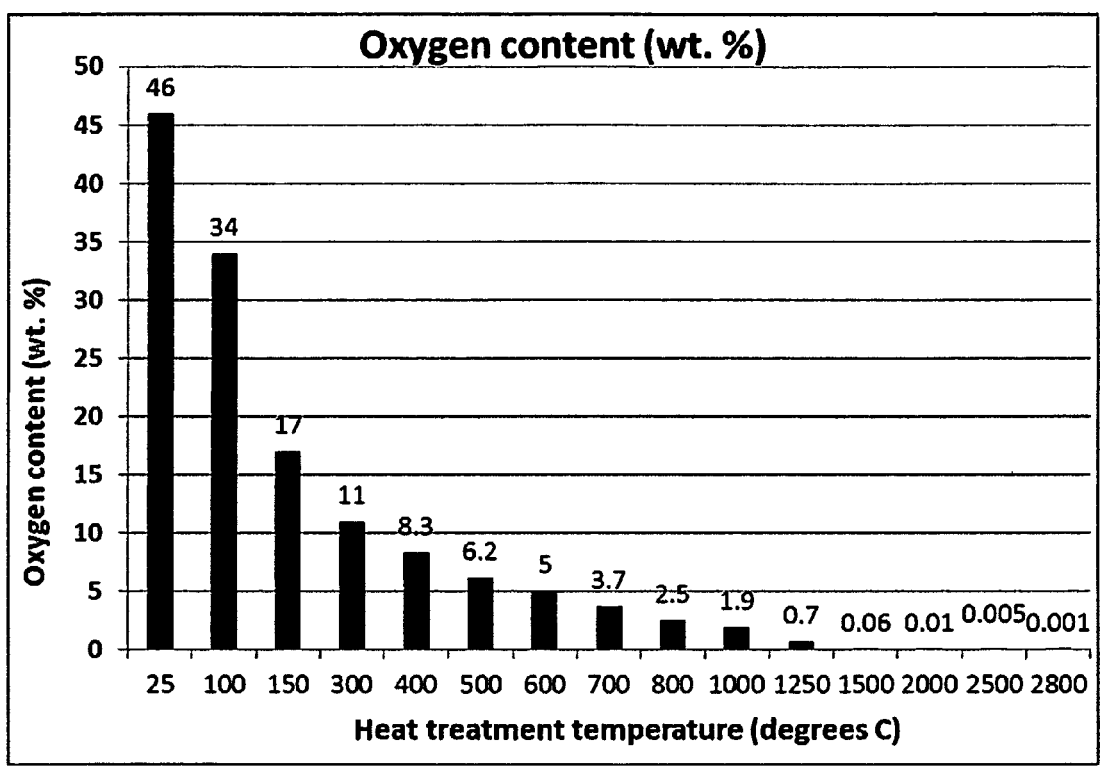
Figure 6C:
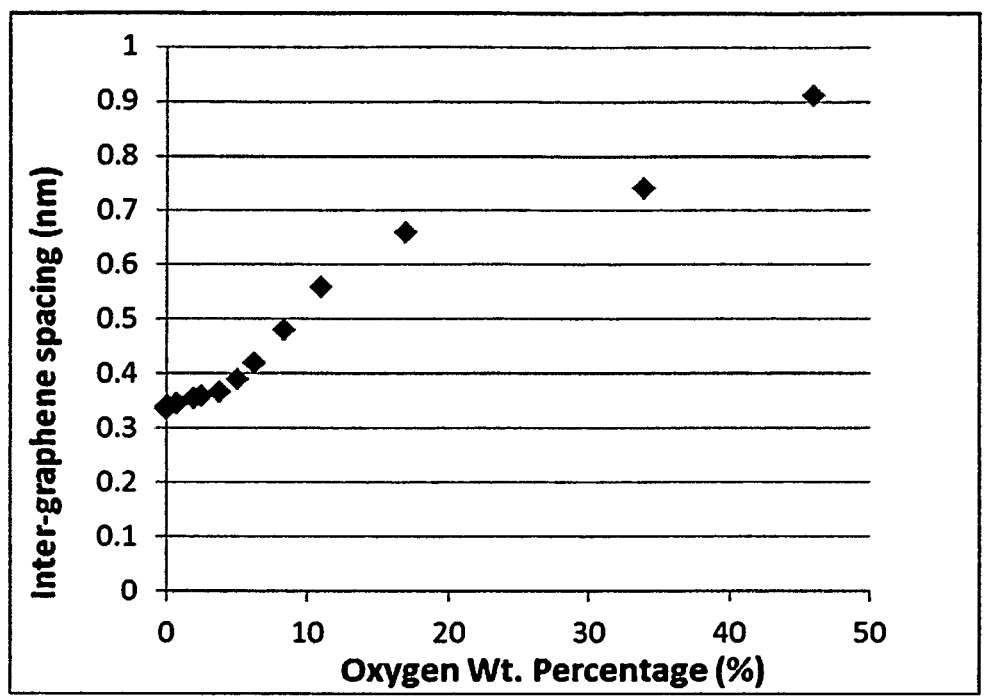
Figure 6D:
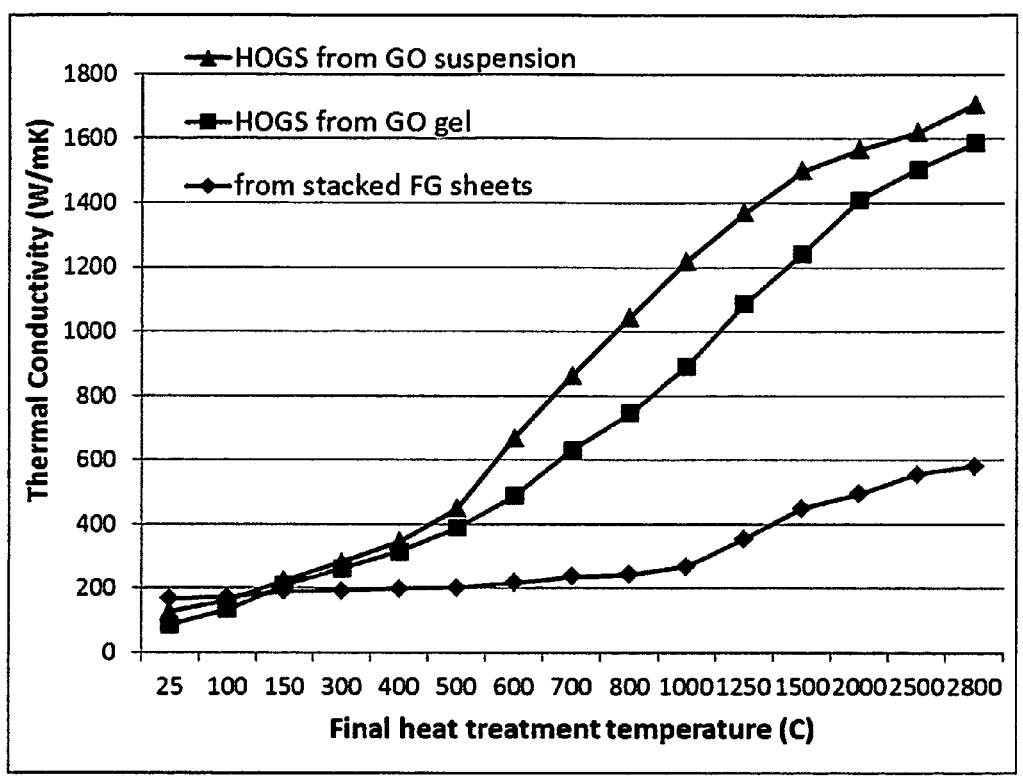

The inter-graphene spacing values of both the GO suspension- and GO gel-derived HOGS samples obtained by heat treating at various temperatures over a wide temperature range are summarized in FIG. 6(A). Corresponding oxygen content values in the GO suspension-derived unitary graphene layer are shown in FIG. 6(B). In order to show the correlation between the inter-graphene spacing and the oxygen content, the data in FIGS. 6(A) and 6(B) are re-plotted in FIG. 6(C). A close scrutiny of FIG. 6(A)-(C) indicate that there are four HTT ranges (100-500° C.; 500-1,500° C.; 1,500-2,000° C., and >2,000° C.) that lead to four respective oxygen content ranges and inter-graphene spacing ranges. The thermal conductivity of the GO gel- and GO suspension-derived HOGS specimens and the corresponding sample of stacked flexible graphite (FG) foil sheets, also plotted as a function of the same final heat treatment temperature range, is summarized in FIG. 6(D). All these stacked and compressed samples have comparable thickness values.

It is of significance to point out that a heat treatment temperature as low as 500° C. is sufficient to bring the average inter-graphene spacing in GO to below 0.4 nm, getting closer and closer to that of natural graphite or that of a graphite single crystal. The beauty of this approach is the notion that this GO suspension strategy has enabled us to re-organize, re-orient, and chemically merge the planar graphene oxide molecules from originally different graphite particles or graphene sheets into a unified structure with all the graphene planes now being larger in lateral dimensions (significantly larger than the length and width of the graphene planes in the original graphite particles) and essentially parallel to one another. This has given rise to a thermal conductivity already >440 W/mK (with a HTT of 500° C.) and >860 W/mk with a HTT of 700° C.), which is more than 2- to 4-fold greater than the value (200 W/mK) of the corresponding flexible graphite foil. These planar GO molecules are derived from the graphene planes that constitute the original structure of starting natural graphite particles (used in the procedure of graphite oxidation to form the GO sheets). The original natural graphite particles, when randomly packed into an aggregate or "graphite compact", would have their constituent graphene planes randomly oriented, exhibiting relatively low thermal conductivity and having essentially zero strength (no structural integrity). In contrast, the flexural strength of the thick HOGS samples (even without an added reinforcement) can reach 134 MPa.

With a HTT as low as 800° C., the resulting HOGS exhibits a thermal conductivity of 1,044 W/mK, in contrast to the observed 244 W/mK of the flexible graphite foil with an identical heat treatment temperature. As a matter of fact, no matter how high the HTT is (e.g. even as high as 2,800° C.), the flexible graphite foil only shows a thermal conductivity lower than 600 W/mK. At a HTT of 2,800° C., the presently invented unitary graphene layer delivers a thermal conductivity of 1,708 W/mK (FIG. 4(A) and FIG. 6(D)).

Scanning electron microscopy (SEM), transmission electron microscopy (TEM) pictures of lattice imaging of the graphene layer, as well as selected-area electron diffraction (SAD), bright field (BF), and dark-field (DF) images were also conducted to characterize the structure of unitary graphene materials. For measurement of cross-sectional views of the film, the sample was buried in a polymer matrix, sliced using an ultra-microtome, and etched with Ar plasma.

Figure 2A:
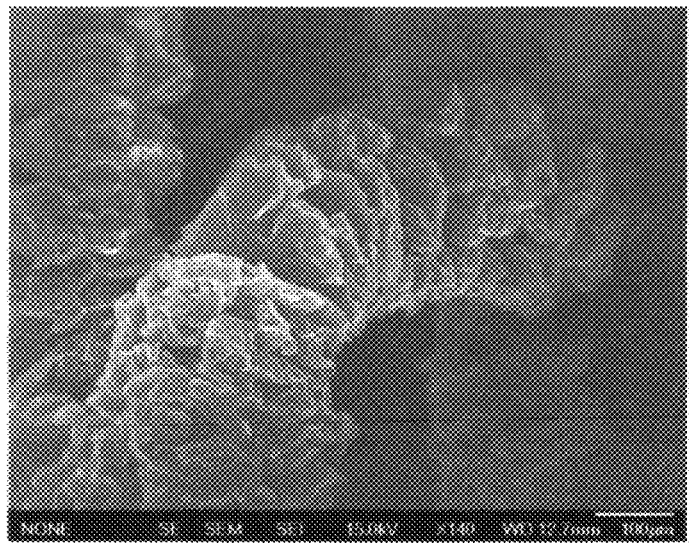
FIG. 2 (A) A SEM image of a graphite worm sample after thermal exfoliation of graphite intercalation compounds (GICs) or graphite oxide powders; (B) An SEM-image of a cross-section of a flexible graphite foil, showing many graphite flakes with orientations not parallel to the flexible graphite foil surface and also showing many defects, kinked or folded flakes.
Figure 2B:
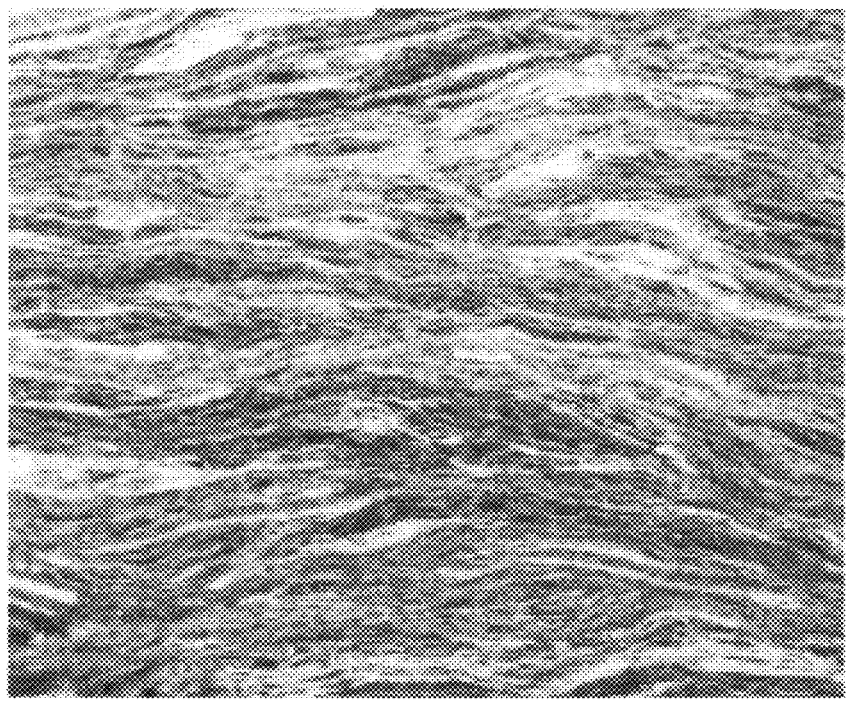

A close scrutiny and comparison of FIGS. 2(A), 3(A), and 3(B) indicates that the graphene layers in a graphene single crystal or graphene monolithic are substantially oriented parallel to one another; but this is not the case for flexible graphite foils and graphene oxide paper. The inclination angles between two identifiable layers in the unitary graphene entity are mostly less than 5 degrees. In contrast, there are so many folded graphite flakes, kinks, and mis-orientations in flexible graphite that many of the angles between two graphite flakes are greater than 10 degrees, some as high as 45 degrees (FIG. 2(B)). Although not nearly as bad, the mis-orientations between graphene platelets in NGP paper (FIG. 3(B)) are also high and there are many gaps between platelets. The unitary graphene entity is essentially gap-free.

FIG. 4 (A) shows the thermal conductivity values of the GO suspension-derived HOGS (♥), GO suspension-derived HOGS (■), stacked sheets of GO platelet paper (♦) prepared by vacuum-assisted filtration of RGO, and FG foil (x), respectively, all plotted as a function of the final HTT for graphitization or re-graphitization. These data have clearly demonstrated the superiority of the HOGS structures in terms of the achievable thermal conductivity at a given heat treatment temperature.

1) All the prior art work on the preparation of paper or membrane from pristine graphene or graphene oxide sheets/platelets follows distinctly different processing paths, leading to a simple aggregate or stack of discrete graphene/GO/RGO platelets. These simple aggregates or stacks exhibit many folded graphite flakes, kinks, gaps, and mis-orientations, resulting in poor thermal conductivity, low electrical conductivity, and weak mechanical strength.

Figure 4A:
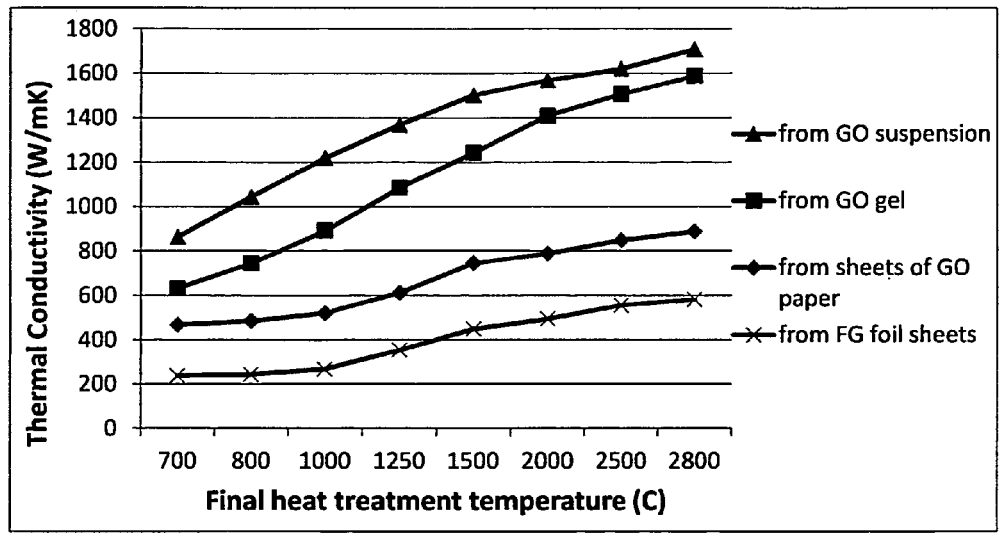
FIG. 4 (A) Thermal conductivity values of the GO dispersion (suspension)-derived HOGS, GO gel-derived HOGS, stacked and compressed sheets of GO platelet paper, and stacked and compressed sheets of FG foil plotted as a function of the final heat treatment temperature for graphitization or re-graphitization; (B) Thermal conductivity values of the GO dispersion-derived HOGS, the CVD carbon- and the polyimide-derived HOPG, all plotted as a function of the final graphitization or re-graphitization temperature; and (C) Electric conductivity values.

As shown in FIG. 4(A), even at a heat treatment temperature as high as 2,800° C., the stacked sheets of GO platelet paper exhibits a thermal conductivity less than 1,000 W/mK, much lower than the >1,700 W/mK of the GO-derived HOGS.

2) The GO suspension-derived HOGS appears to be superior to the GO gel-derived HOGS in thermal conductivity at comparable final heat treatment temperatures. The heavy oxidation of graphene sheets in GO gel might have resulted in high defect populations on graphene surfaces even after thermal reduction and re-graphitization.

3) For comparison, we have also obtained conventional highly oriented pyrolytic graphite (HOPG) samples from both the CVD carbon film route and the polyimide (PI) carbonization route. The CVD carbon was obtained at 1,100° C. on a Cu substrate. The polyimide films were carbonized at 500° C. for 1 hour and at 1,000° C. for 3 hours in an inert atmosphere. Both the CVD carbon films and carbonized PI films were then graphitized at a temperature in the range of 2,500-3,000° C., under a compressive force, for 1 to 5 hours to form a conventional HPOG structure. The CVD carbon-derived HOPG was very thin (<less than 1 μm in thickness) due to the limitation of the CVD process. Other samples were all approximately 300 μm thick.

Figure 4B:
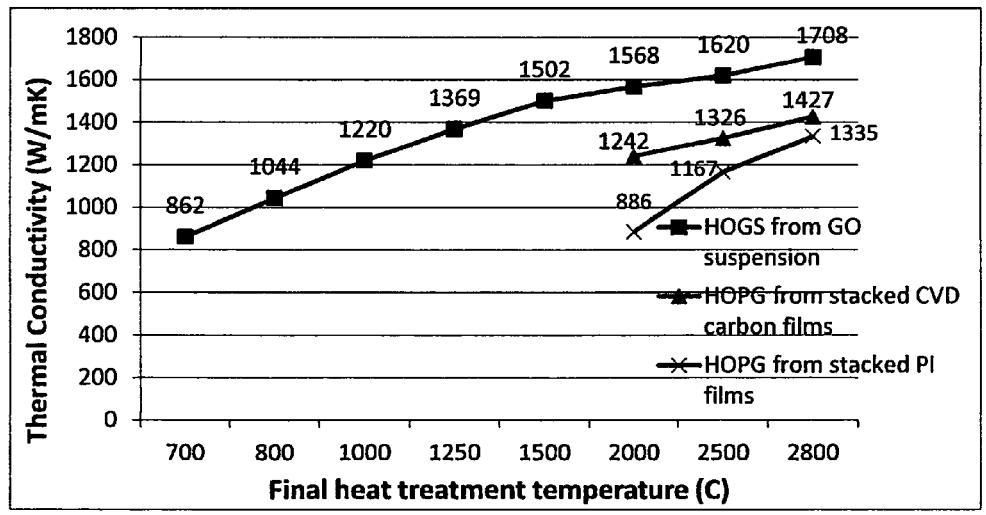

FIG. 4(B) shows the thermal conductivity values of the GO suspension-derived HOGS (■), the CVD carbon-derived HOPG (▲), and the polyimide-derived HOPG heat-treated for three hours (x) under compression, all plotted as a function of the final graphitization or re-graphitization temperature. These data show that the conventional HOPG, produced by either CVD or carbonized polyimide (PI) route, exhibits a consistently lower thermal conductivity as compared to the GO suspension-derived HOGS (■), given the same HTT for the same length of heat treatment time. For instance, the HOPG from PI exhibits a thermal conductivity of 886 W/mK after a graphitization treatment at 2,000° C. for 3 hours. At the same final graphitization temperature, the HOGS exhibits a thermal conductivity value of 1,568 W/mK. That the CVD carbon-derived HOPG shows a higher thermal conductivity value compared to the corresponding PI-derived HOPG might be due to the shear low thickness of CVD film that was easier to achieve higher orientation as compared to PI.

4) These observations have demonstrated a clear and significant advantage of using the GO gel approach to producing unitary graphene materials versus the conventional PG approach to producing oriented graphite crystals. As a matter of fact, no matter how long the graphitization time is for the HOPG, the thermal conductivity is always lower than that of a GO gel-derived HOGS. In other words, the HOGS material is fundamentally different and patently distinct from the flexible graphite (FG) foil, graphene/GO/RGO paper/membrane, and pyrolytic graphite (PG) in terms of chemical composition, crystal and defect structure, crystal orientation, morphology, process of production, and properties.

Figure 4C:
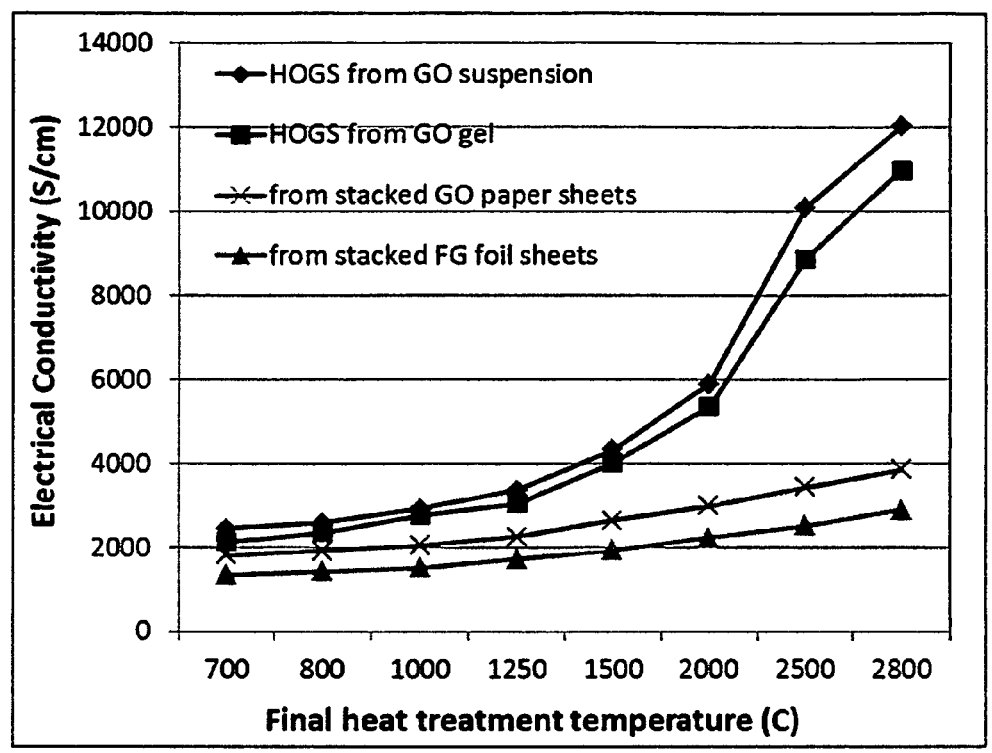

5) The above conclusion is further supported by the data in FIG. 4(C) showing the electric conductivity values of the GO suspension-derived HOGS (♦) and GO gel-derived HOGS (■) are far superior to those of the GO paper compact from RGO platelets (x) and compact of FG foil sheets (▲) over the entire range of final HTTs investigated.

Example 4

Preparation of Pristine Graphene Sheets/Platelets (0% Oxygen) and the Effect of Pristine Graphene Sheets Recognizing the possibility of the high defect population in GO sheets acting to reduce the conductivity of individual graphene plane, we decided to study if the use of pristine graphene sheets (non-oxidized and oxygen-free) can lead to a HOGS having a higher thermal conductivity. Pristine graphene sheets were produced by using the direct ultrasonication or liquid-phase production process.

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson 5450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free.

Figure 9:
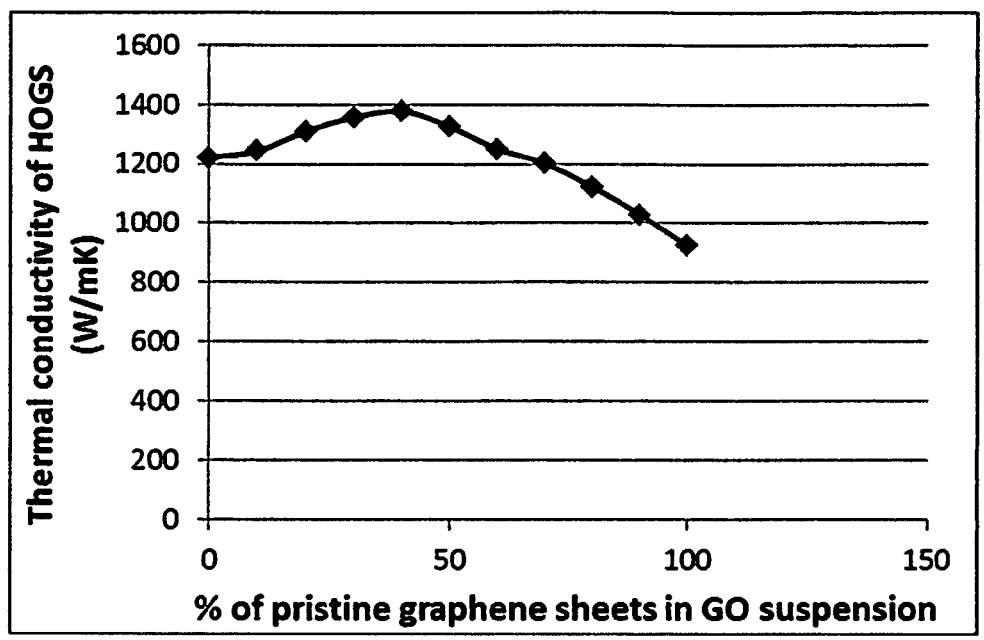
FIG. 9 Thermal conductivity of HOGS samples (prepared with a final heat treatment temperature of 1,000° C. and a final thickness of approximately 0.5 mm) plotted as a function of the proportion of pristine graphene sheets in a GO suspension.

Various amounts of pristine graphene sheets were added to GO suspensions to obtain mixture suspensions wherein GO and pristine graphene sheets are dispersed in a liquid medium. The same procedure was then followed to produce HOGS samples of various pristine graphene proportions. The thermal conductivity data of these samples are summarized in FIG. 9, which indicate that the thermal conductivity of the HOGS produced from pure pristine graphene sheets (presumably themselves being highly conducting) is surprisingly lower than that of the HOGS from GO sheets (of low conductivity due to high defect population on graphene planes). SEM examination of the samples indicate that the pristine graphene sheet-derived HOGS has poor graphene sheet orientation and has many graphene sheet kinks and foldings.

Further surprisingly, there are synergistic effects that can be observed when both the pristine graphene sheets and GO sheets co-exist in proper proportions. It seems that GO can help pristine graphene sheets get dispersed well in a suspension and get them better oriented when being coated or cast into thin films. Yet, the high conductivity of pristine graphene sheets, when properly oriented, helps the resulting HOGS achieve a higher over-all conductivity.

Examples 5

Flexural Strength of Various Graphene Oxide-Derived HOGS

Figure 7A:
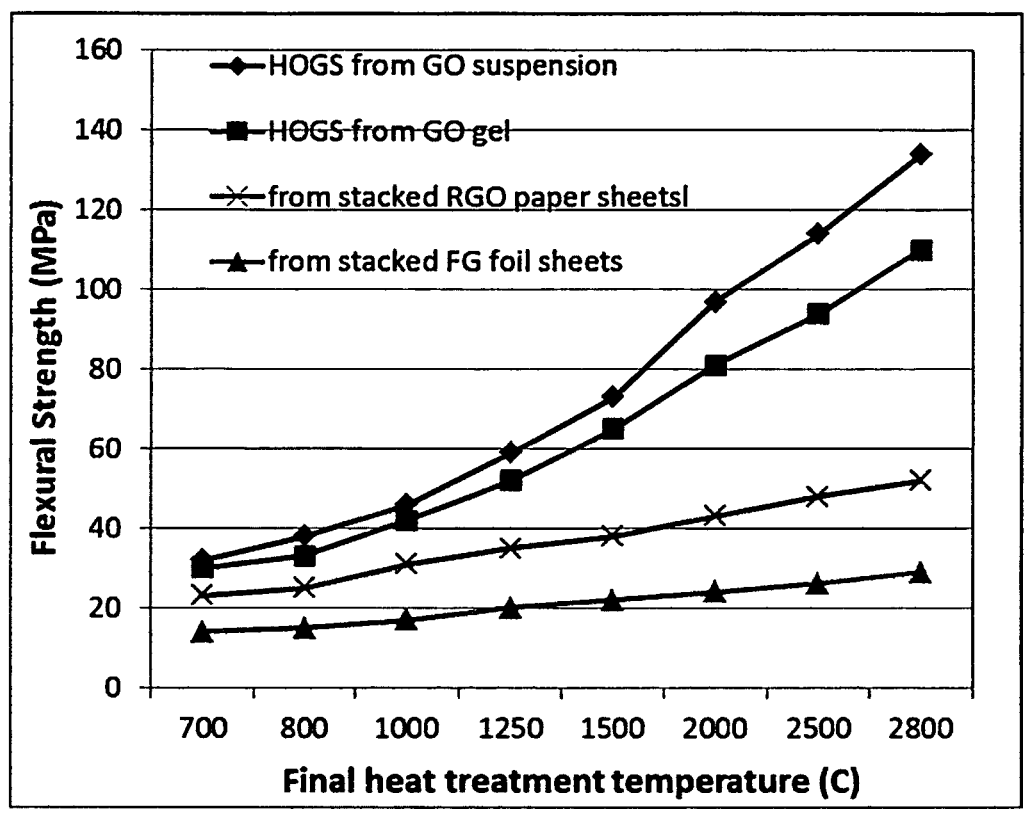
FIG. 7 (A) Flexural strength and (B) flexural modulus of the HOGF from GO dispersion, HOGS from GO gel, stacked and compressed pieces of GO platelet paper, and stacked and compressed pieces of flexible graphite foil sheets over a range of heat treatment temperatures.
Figure 7B:
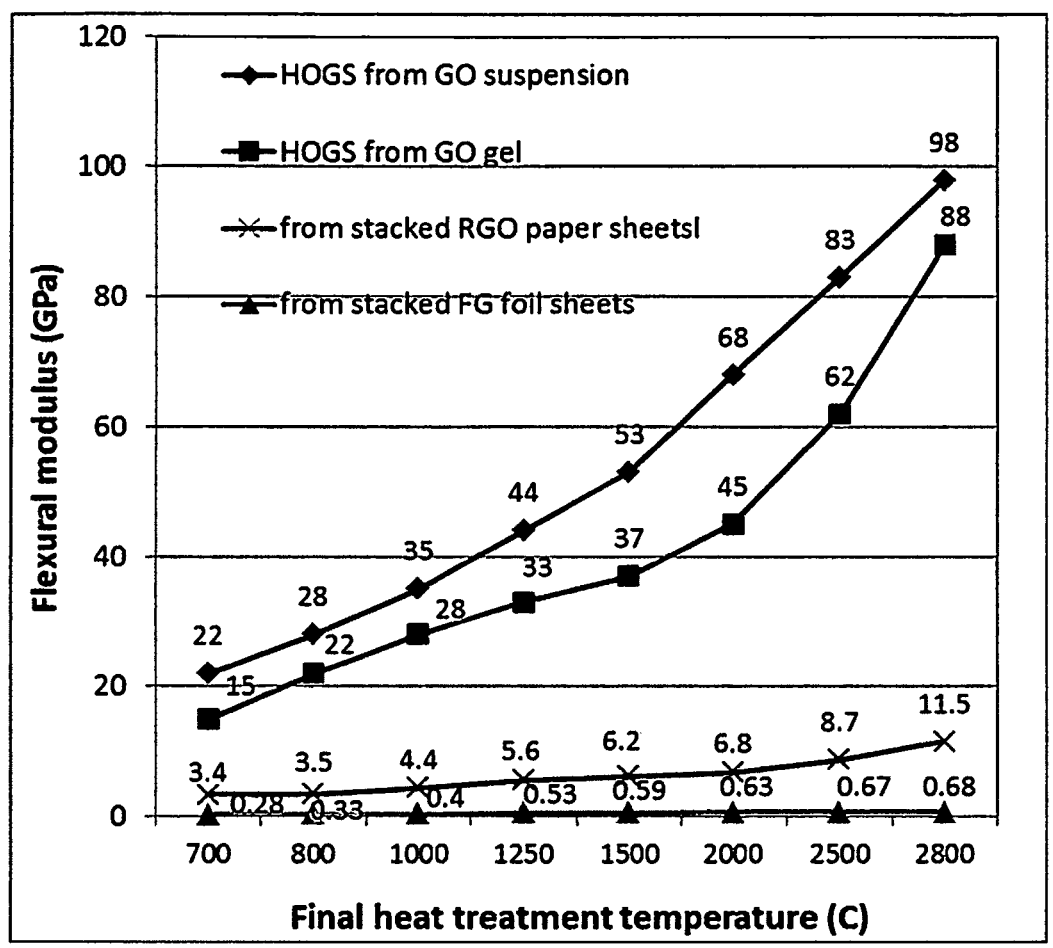

A series of GO dispersion-derived HOGS, GO gel-derived HOGS, stacked/compressed sheets of GO platelet paper, and stacked/compressed sheets of FG foil were prepared by using a comparable final heat treatment temperature for all materials. A universal testing machine was used to determine the flexural strength of these materials. The flexural strength and flexural modulus of the HOGS samples from GO dispersion, HOGS from GO gel, stacked/compressed pieces of GO platelet paper, and stacked/compressed pieces of flexible graphite foil sheets over a range of heat treatment temperatures are shown in FIGS. 7(A) and 7(B), respectively.

These data have demonstrated that the flexural strength of the flexible graphite foil-derived HOPG increases slightly with the final heat treatment temperature (from 14 to 29 MPa) and that of the GO paper-derived HOPG (stacked/compressed/heated sheets of GO paper) increases from 23 to 52 MPa when the final heat treatment temperature increases from 700 to 2,800° C. In contrast, the flexural strength of the GO gel-derived HOGS increases significantly from 30 to >110 MPa over the same range of heat treatment temperatures. Most dramatically, the flexural strength of the GO suspension-derived HOGS increases significantly from 32 to >134 MPa This result is quite striking and further reflects the notion that the GO dispersion- and GO gel-derived GO layers contain highly live and active GO sheets or molecules during the heat treatment that are capable of chemical linking and merging, while the graphene platelets in the conventional GO paper and the graphite flakes in the FG foil are essentially dead platelets. The GO-derived HOGS is a new class of material by itself.

In conclusion, we have successfully developed an absolutely new, novel, unexpected, and patently distinct class of highly conducting and high-strength material: highly oriented graphene structure (HOGS). The chemical composition (oxygen content), structure (crystal perfection, grain size, defect population, etc), crystal orientation, morphology, process of production, and properties of this new class of materials are fundamentally different and patently distinct from flexible graphite foil, polymer-derived pyrolytic graphite, CVD-derived HOPG, and catalytic CVD graphene thin film. The thermal conductivity, electrical conductivity, elastic modulus, and flexural strength exhibited by the presently invented materials are much higher than what prior art flexible graphite sheets, paper of discrete graphene/GO/RGO platelets, or other graphitic materials could possibly achieve. These HOGS materials have the best combination of excellent electrical conductivity, thermal conductivity, mechanical strength, and stiffness (modulus). These HOGS materials can be used in a wide variety of thermal management applications. For instance, a HOGS structure can be part of a thermal management device such as a heat dissipation plate for use in a microelectronic device, LED lighting device, and photovoltaic energy device.

We claim:

1. A process for producing a bulk highly oriented graphene structure with a thickness greater than 0.1 mm, said process comprising:
    (a) preparing either a graphene oxide dispersion having graphene oxide sheets dispersed in a fluid medium or a graphene oxide gel having graphene oxide molecules dissolved in a fluid medium, wherein said graphene oxide sheets or graphene oxide molecules contain an oxygen content higher than 5% by weight;
    (b) dispensing and depositing said graphene oxide dispersion or graphene oxide gel onto a surface of a supporting substrate to form a first layer of graphene oxide, wherein said dispensing and depositing procedure includes subjecting said graphene oxide dispersion or graphene oxide gel to an orientation-inducing stress;
    (c) partially or completely removing said fluid medium from the first layer of graphene oxide to form a first dried layer of graphene oxide having an inter-plane spacing $d_{002}$ of 0.4 nm to 1.2 nm as determined by X-ray diffraction and an oxygen content no less than 5% by weight;
    (d) preparing at least a second dried layer of graphene oxide by repeating steps (b) and (c) at least one time or preparing multiple sheets of dried graphene oxide by slicing said first dried layer of graphene oxide;
    (e) stacking either said first dried layer of graphene oxide with said at least the second dried layer of graphene oxide or said multiple sheets of dried graphene oxide under an optional first compressive stress to form a mass of multiple layers of graphene oxide; and
    (f) heat treating the mass of multiple layers of graphene oxide under an optional second compressive stress to produce said highly oriented graphene structure at a first heat treatment temperature higher than 100° C. to an extent that an inter-plane spacing $d_{002}$ is decreased to a value less than 0.4 nm and the oxygen content is decreased to less than 5% by weight, wherein said step (f) occurs before, during, or after said step (e).

2. A process for producing a bulk highly oriented graphene structure with a thickness greater than 0.1 mm, said process comprising:
    (a) preparing either a graphene oxide dispersion having graphene oxide sheets dispersed in a fluid medium or a graphene oxide gel having graphene oxide molecules dissolved in a fluid medium, wherein said graphene oxide sheets or graphene oxide molecules contain an oxygen content higher than 5% by weight;
    (b) dispensing and depositing said graphene oxide dispersion or graphene oxide gel onto a surface of a supporting substrate to form a first layer of graphene oxide, wherein said dispensing and depositing procedure includes subjecting said graphene oxide dispersion or graphene oxide gel to an orientation-inducing stress;
    (c) partially or completely removing said fluid medium from the first layer of graphene oxide to form a first dried layer of graphene oxide having an inter-plane spacing $d_{002}$ of 0.4 nm to 1.2 nm as determined by X-ray diffraction and an oxygen content no less than 5% by weight;
    (d) preparing at least a second dried layer of graphene oxide by repeating steps (b) and (c) at least one time or preparing multiple sheets of dried graphene oxide by slicing said first dried layer of graphene oxide;
    (e) heat treating said first dried layer of graphene oxide and said, at least second dried layer of graphene oxide or said multiple sheets of dried graphene oxide at a first heat treatment temperature higher than 100° C. under an optional first compressive stress to an extent that an inter-plane spacing $d_{002}$ in said first dried layer, second dried layer, or multiple sheets of dried graphene oxide is decreased to a value less than 0.4 nm and the oxygen content is decreased to less than 5% by weight; and
    (f) stacking said first with said at least the second dried layer of graphene oxide or stacking said multiple sheets of dried graphene oxide under a second compressive stress to form said highly oriented graphene structure, wherein said step (f) occurs before, during, or after said step (e).

3. The process of claim 1, wherein said fluid medium further contains pristine graphene sheets and a pristine graphene to graphene oxide ratio is from 1/100 to 100/1.

4. The process of claim 2, wherein said fluid medium further contains pristine graphene sheets and a pristine graphene to graphene oxide ratio is from 1/100 to 100/1.

5. The process of claim 1, wherein said step (f) further includes heat-treating the graphene oxide mass at a second heat treatment temperature higher than 280° C. for a length of time sufficient for decreasing an inter-plane spacing $d_{002}$ to a value of from 0.3354 nm to 0.36 nm and decreasing the oxygen content to less than 2% by weight.

6. The process of claim 2, further comprising heat-treating said highly oriented graphene structure at a second heat treatment temperature higher than 280° C. for a length of time sufficient for decreasing an inter-plane spacing $d_{002}$ to a value of from 0.3354 nm to 0.36 nm and decreasing the oxygen content to less than 2% by weight.

7. The process of claim 1, wherein said fluid medium consists of water and/or an alcohol.

8. The process of claim 5, wherein said second heat treatment temperature includes at least a temperature selected from (A) 300-1,500° C., (B) 1,500-2,100° C., and/or (C) higher than 2,100° C.

9. The process of claim 6, wherein said second heat treatment temperature includes at least a temperature selected from (A) 300-1,500° C., (B) 1,500-2,100° C., and/or (C) higher than 2,100° C.

10. The process of claim 5, wherein said second heat treatment temperature includes a temperature in the range of 300-1,500° C. for at least 1 hour and then a temperature in the range of 1,500-3,200° C. for at least 1 hour.

11. The process of claim 6, wherein said second heat treatment temperature includes a temperature in the range of 300-1,500° C. for at least 1 hour and then a temperature in the range of 1,500-3,200° C. for at least 1 hour.

12. The process of claim 5, further comprising a compression step to reduce a thickness of said highly oriented graphene structure.

13. The process of claim 6, further comprising a compression step to reduce a thickness of said highly oriented graphene structure.

14. The process of claim 1, wherein said first dried layer, said second dried layer, or said multiple sheets of graphene oxide has a thickness no greater than 100 μm.

15. The process of claim 1, wherein said first dried layer, said second dried layer, or said multiple sheets of graphene oxide has a thickness no greater than 50 μm.

16. The process of claim 1, wherein said first dried layer, said second dried layer, or said multiple sheets of graphene oxide has a thickness no greater than 20 μm.

17. The process of claim 1, wherein said graphene oxide dispersion or graphene oxide gel has at least 3% by weight of graphene oxide dispersed in said fluid medium to form a liquid crystal phase.

18. The process of claim 2, wherein said graphene oxide dispersion has at least 5% by weight of graphene oxide dispersed in said fluid medium to form a liquid crystal phase.

19. The process of claim 1, wherein said bulk highly oriented graphene structure has a thickness greater than 0.5 mm.

20. The process of claim 2, wherein said bulk highly oriented graphene structure has a thickness greater than 5 mm.

21. The process of claim 1, wherein said graphene oxide dispersion or graphene oxide gel is prepared by immersing a graphitic material in a powder or fibrous form in an oxidizing liquid in a reaction vessel at a reaction temperature for a length of time sufficient to obtain said graphene oxide dispersion or said graphene oxide gel wherein said graphitic material is selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof and wherein said graphene oxide has an oxygen content no less than 5% by weight.

22. The process of claim 1, wherein said steps (b) and (c) include feeding a sheet of a solid substrate material from a roller to a deposition zone, depositing a layer of graphene oxide dispersion or graphene oxide gel onto a surface of said sheet of solid substrate material to form said first graphene oxide layer thereon, drying said graphene oxide dispersion or graphene oxide gel to form the first dried graphene oxide layer deposited on said substrate surface, and collecting said first dried graphene oxide layer-deposited substrate sheet on a collector roller.

23. The process of claim 5, wherein said first and/or second heat treatment temperature contains a temperature in the range of 500° C.-1,500° C. and the highly oriented graphene structure has an oxygen content less than 1%, an inter-graphene spacing less than 0.345 nm, a thermal conductivity of at least 1,000 W/mK, and/or an electrical conductivity no less than 3,000 S/cm.

24. The process of claim 6, wherein said first and/or second heat treatment temperature contains a temperature in the range of 1,500° C.-2,100° C. and the highly oriented graphene structure has an oxygen content less than 0.01%, an inter-graphene spacing less than 0.337 nm, a thermal conductivity of at least 1,300 W/mK, and/or an electrical conductivity no less than 5,000 S/cm.

25. The process of claim 5, wherein said first and/or second heat treatment temperature contains a temperature greater than 2,100° C. and the highly oriented graphene structure has an oxygen content no greater than 0.001%, an inter-graphene spacing less than 0.336 nm, a mosaic spread value no greater than 0.7, a thermal conductivity of at least 1,500 W/mK, and/or an electrical conductivity no less than 10,000 S/cm.

26. The process of claim 6, wherein said first and/or second heat treatment temperature contains a temperature no less than 2,500° C. and the highly oriented graphene structure has an inter-graphene spacing less than 0.336 nm, a mosaic spread value no greater than 0.4, a thermal conductivity greater than 1,600 W/mK, and/or an electrical conductivity greater than 10,000 S/cm.

27. The process of claim 1, wherein the highly oriented graphene structure exhibits an inter-graphene spacing less than 0.337 nm and a mosaic spread value less than 1.0.

28. The process of claim 2, wherein the highly oriented graphene structure exhibits a degree of graphitization no less than 80% and/or a mosaic spread value less than 0.4.

29. The process of claim 1, wherein the highly oriented graphene structure exhibits a degree of graphitization no less than 90% and/or a mosaic spread value no greater than 0.4.

30. The process of claim 1, wherein said highly oriented graphene structure contains chemically bonded graphene planes that are parallel to one another.

31. The process of claim 1, wherein said graphene oxide dispersion or graphene oxide gel is obtained from a graphitic material having a maximum original graphite grain size and said highly oriented graphene structure is a single crystal or a poly-crystal graphene structure having a grain size larger than said maximum original grain size.

32. The process of claim 2, wherein said graphene oxide dispersion or graphene oxide gel is obtained from a graphitic material having multiple graphite crystallites exhibiting no preferred crystalline orientation as determined by an X-ray diffraction or electron diffraction method and wherein said highly oriented graphene structure is a single crystal or a poly-crystal graphene structure having a preferred crystalline orientation as determined by said X-ray diffraction or electron diffraction method.

33. The process of claim 1, wherein said highly oriented graphene structure contains a combination of $sp^2$ and $sp^a$ electronic configurations.

34. The process of claim 1, wherein said step of heat-treating induces chemical linking, merging, or chemical bonding of graphene oxide sheets, and/or re-graphitization or re-organization of a graphitic structure.

35. The process of claim 2, wherein said highly oriented graphene structure has an electrical conductivity greater than 5,000 S/cm, a thermal conductivity greater than 800 W/mK, a physical density greater than 1.9 g/cm3, a flexural strength greater than 100 MPa, and/or a flexural modulus greater than 60 GPa.

36. The process of claim 2, wherein said highly oriented graphene structure has an electrical conductivity greater than 8,000 S/cm, a thermal conductivity greater than 1,200 W/mK, a physical density greater than 2.0 g/cm3, a flexural strength greater than 140 MPa, and/or a flexural modulus greater than 80 GPa.

37. The process of claim 2, wherein said unitary graphene structure has an electrical conductivity greater than 12,000 S/cm, a thermal conductivity greater than 1,500 W/mK, a physical density greater than 2.1 g/cm$^3$, a flexural strength greater than 160 MPa, and/or a flexural modulus greater than 120 GPa.

* * * * *